US010282445B1

United States Patent
Lu

(10) Patent No.: US 10,282,445 B1
(45) Date of Patent: May 7, 2019

(54) INCREMENTAL KURTOSIS CALCULATION FOR BIG DATA OR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 433 days.

(21) Appl. No.: 14/964,541

(22) Filed: Dec. 9, 2015

Related U.S. Application Data

(60) Provisional application No. 62/089,235, filed on Dec. 9, 2014.

(51) Int. Cl.
*G06F 7/02* (2006.01)
*G06F 17/30* (2006.01)
*G06F 17/18* (2006.01)

(52) U.S. Cl.
CPC ........ *G06F 17/30442* (2013.01); *G06F 17/18* (2013.01); *G06F 17/30516* (2013.01); *G06F 17/30598* (2013.01)

(58) Field of Classification Search
CPC .... G06F 17/18; G06F 17/30; G06F 17/30516; G06F 17/30598
See application file for complete search history.

(56) References Cited

U.S. PATENT DOCUMENTS

| 7,747,413 | B2 | 6/2010 | Ramsey et al. | |
|---|---|---|---|---|
| 7,840,377 | B2 | 11/2010 | Ramsey et al. | |
| 9,069,726 | B2 | 6/2015 | Lu | |
| 2014/0105262 | A1* | 4/2014 | Alloin | H04B 3/46 375/222 |
| 2014/0164456 | A1 | 6/2014 | Lu | |
| 2014/0351233 | A1* | 11/2014 | Crupi | G06F 17/30516 707/706 |
| 2018/0285780 | A1* | 10/2018 | Ouyang | G06N 99/005 |

* cited by examiner

*Primary Examiner* — Bruce M Moser

(57) ABSTRACT

The present invention extends to methods, systems, and computing system program products for incrementally calculating kurtosis for Big Data or streamed data in real time by incrementally calculating one or more components of kurtosis. Embodiments of the invention include incrementally calculating one or more components of a kurtosis for a modified computation subset based on the one or more components of the kurtosis calculated for a pre-modified computation subset and then calculating the kurtosis based on the incrementally calculated components. Incrementally calculating kurtosis avoids visiting all data elements in the modified computation subset and performing redundant computations thereby increasing calculation efficiency, saving computing resources and reducing computing system's power consumption.

20 Claims, 26 Drawing Sheets

The Definition of Kurtosis:

Suppose computation subset $X$ composes of $n$ data elements: $X = \{x_i | i = 1, \ldots, n\}$ which is a subset of a Big Data set or streamed data.

Define the sum of the computation subset $X$ with size $n$ in the $k^{th}$ iteration as below:

$$S_k = x_1 + x_2 + x_3 + \cdots + x_n = \sum_1^n x_i \qquad \text{401}$$

Define the mean of the computation subset $X$ with size $n$ in the $k^{th}$ iteration as below:

$$\bar{x}_k = \frac{(x_1 + x_2 + x_3 + \cdots + x_n)}{n} = \frac{\sum_1^n x_i}{n} \qquad \text{402}$$

The kurtosis of the computation subset $X$ with size $n$ in the $k^{th}$ iteration is defined as:

$$\gamma_k^{(2)} = \frac{\frac{1}{n}\sum_1^n (x_i - \bar{x}_k)^4}{\left(\frac{1}{n}\sum_1^n (x_i - \bar{x}_k)^2\right)^2} = \frac{n \sum_1^n (x_i - \bar{x}_k)^4}{(\sum_1^n (x_i - \bar{x}_k)^2)^2} \qquad \text{403}$$

Suppose calculated $\gamma_k^{(2)}$ has already been calculated, and the kurtosis of the computation subset $X$ needs to be calculated again after a new data element $x_a$ has been added to $X$. Define the updated computation subset as $X'$.

Define the sum of $X'$ with size $n + 1$ in the $k+1^{th}$ iteration as below:

$$S_{k+1} = x_1 + x_2 + x_3 + \cdots + x_n + x_a = \sum_1^n x_i + x_a \qquad \text{404}$$

Define the mean of $X'$ with size $n + 1$ in the $k+1^{th}$ iteration as below:

$$\bar{x}_{k+1} = \frac{(x_1 + x_2 + x_3 + \cdots + x_n + x_a)}{n+1} = \frac{\sum_1^n x_i + x_a}{n+1} \qquad \text{405}$$

The kurtosis of the updated data set $X'$ with size $n + 1$ in the $k+1^{th}$ iteration is defined as:

$$\gamma_{k+1}^{(2)} = \frac{\frac{1}{n+1}(\sum_1^n (x_i - \bar{x}_{k+1})^4 + (x_a - \bar{x}_{k+1})^4)}{\left(\frac{1}{n+1}(\sum_1^n (x_i - \bar{x}_{k+1})^2 + (x_a - \bar{x}_{k+1})^2)\right)^2} = \frac{(n+1)(\sum_1^n (x_i - \bar{x}_{k+1})^4 + (x_a - \bar{x}_{k+1})^4)}{(\sum_1^n (x_i - \bar{x}_{k+1})^2 + (x_a - \bar{x}_{k+1})^2)^2} \qquad \text{406}$$

Fig. 4A

Some Example Components of a Kurtosis:

A component of a kurtosis is a quantity or expression appearing in a kurtosis's definition equation or any transforms of the equation. The following are some example components of a kurtosis.

- $S_k = \sum_1^n x_i$
- $\bar{x}_k = \frac{S_k}{n} = \frac{1}{n}\sum_1^n x_i$
- $SS_k = \sum_1^n x_i^2$
- $SX_k = \sum_1^n (x_i - \bar{x}_k)^2$
- $CS_k = \sum_1^n x_i^3$
- $CX_k = \sum_1^n (x_i - \bar{x}_k)^3$
- $QS_k = \sum_1^n x_i^4$
- $QX_k = \sum_1^n (x_i - \bar{x}_k)^4$
- $\frac{1}{n}\sum_1^n (x_i - \bar{x}_k)^2$
- $\frac{1}{n}\sum_1^n (x_i - \bar{x}_k)^3$
- $\frac{1}{n}\sum_1^n (x_i - \bar{x}_k)^4$
- $\left(\frac{1}{n}\sum_1^n (x_i - \bar{x}_k)^2\right)^2$
- $\gamma_k^{(2)} = \frac{n\sum_1^n (x_i - \bar{x}_k)^4}{(\sum_1^n (x_i - \bar{x}_k)^2)^2}$ Basic Incremental Component Calculation Equations:

The mean of the data elements in the data set will be used by following incremental algorithms, so we put the equation here instead of in each incremental algorithms.

$S_{k+1}$ defined in equation 404 can be calculated in an incremental way by using $S_k$ defined in equation 401:

$S_{k+1} = S_k + x_a$ ⟶ 407

$\bar{x}_{k+1}$ defined in equation 405 can be calculated in an incremental way by using $\bar{x}_k$ defined in equation 402:

$\bar{x}_{k+1} = \frac{(n\bar{x}_k + x_a)}{n+1}$ ⟶ 408

Fig. 4B

Incremental Algorithm 1:

$SS_k = \sum_1^n x_i^2$    409

$SS_{k+1} = \sum_1^n x_i^2 + x_a^2$    410

$SS_{k+1}$ can be calculated in an incremental way:

$SS_{k+1} = SS_k + x_a^2$    411

$SX_k = \sum_1^n (x_i - \bar{x}_k)^2$    412

$SX_{k+1} = \sum_1^n (x_i - \bar{x}_{k+1})^2 + (x_a - \bar{x}_{k+1})^2$    413

$SX_{k+1}$ can be calculated by using $SS_{k+1}$ and $S_{k+1}$ or $\bar{x}_{k+1}$ $SX_{k+1} = SS_{k+1} - S_{k+1}\bar{x}_{k+1} = SS_{k+1} - S_{k+1}^2/(n+1) = SS_{k+1} - (n+1)\bar{x}_{k+1}^2$    414

$CS_k = \sum_1^n x_i^3$    415

$CS_{k+1} = \sum_1^n x_i^3 + x_a^3$    416

$CS_{k+1}$ can be calculated in an incremental way:

$CS_{k+1} = CS_k + x_a^3$    417

$QX_k = \sum_1^n (x_i - \bar{x}_k)^4$    418

$QX_{k+1} = \sum_1^n (x_i - \bar{x}_{k+1})^4 + (x_a - \bar{x}_{k+1})^4$    419

$QX_{k+1}$ can be calculated in an incremental way using $QX_k$, $CS_k$, $SS_k$, $S_k$ or $\bar{x}_k$ and $S_{k+1}$ or $\bar{x}_{k+1}$:

$QX_{k+1} = QX_k + (x_a - S_{k+1}/(n+1))(x_a^3 - 3S_{k+1}(x_a^2 - S_{k+1}(x_a + S_{k+1}/(n+1))/(n+1))/(n+1)) + (S_k/n - S_{k+1}/(n+1))\left(4CS_k + 3(S_k/n + S_{k+1}/(n+1))(S_k^2/n + n(S_{k+1}/(n+1))^2 - 2SS_k)\right) =$
$QX_k + (x_a - \bar{x}_{k+1})(x_a^3 - 3\bar{x}_{k+1}(x_a^2 - \bar{x}_{k+1}(x_a + \bar{x}_{k+1}))) + (\bar{x}_k - \bar{x}_{k+1})\left(4CS_k + 3(\bar{x}_k + \bar{x}_{k+1})(n(\bar{x}_k^2 + \bar{x}_{k+1}^2) - 2SS_k)\right)$    420

The kurtosis can be calculated by using $QX_{k+1}$ and $SX_{k+1}$ $\gamma_{k+1}^{(2)} = \frac{(n+1)QX_{k+1}}{SX_{k+1}^2}$    421

Fig. 4C

Incremental Algorithm 2:

$SS_k = \sum_1^n x_i^2$ ⌒⌒ 422

$SS_{k+1} = \sum_1^n x_i^2 + x_a^2$ ⌒⌒ 423

$SS_{k+1}$ can be calculated in an incremental way:

$SS_{k+1} = SS_k + x_a^2$ ⌒⌒ 424

$SX_k = \sum_1^n (x_i - \bar{x}_k)^2$ ⌒⌒ 425

$SX_{k+1} = \sum_1^n (x_i - \bar{x}_{k+1})^2 + (x_a - \bar{x}_{k+1})^2$ ⌒⌒ 426

$SX_{k+1}$ can be calculated in an incremental way using $S_k$ or $\bar{x}_k$ and $S_{k+1}$ or $\bar{x}_{k+1}$:

$SX_{k+1} = SX_k + (x_a - S_{k+1}/(n+1))(x_a - S_k/n) = SX_k + (x_a - \bar{x}_{k+1})(x_a - \bar{x}_k)$ ⌒⌒ 427

$CS_k = \sum_1^n x_i^3$ ⌒⌒ 428

$CS_{k+1} = \sum_1^n x_i^3 + x_a^3$ ⌒⌒ 429

$CS_{k+1}$ can be calculated in an incremental way:

$CS_{k+1} = CS_k + x_a^3$ ⌒⌒ 430

$QS_k = \sum_1^n x_i^4$ ⌒⌒ 431

$QS_{k+1} = \sum_1^n x_i^4 + x_a^4$ ⌒⌒ 432

$QS_{k+1}$ can be calculated in an incremental way:

$QS_{k+1} = QS_k + x_a^4$ ⌒⌒ 433

$QX_k = \sum_1^n (x_i - \bar{x}_k)^4$ ⌒⌒ 434

$QX_{k+1} = \sum_1^n (x_i - \bar{x}_{k+1})^4 + (x_a - \bar{x}_{k+1})^4$ ⌒⌒ 435

$QX_{k+1}$ can be calculated by using $QS_{k+1}, CS_{k+1}, SS_{k+1}$ and $S_{k+1}$ or $\bar{x}_{k+1}$ $QX_{k+1} = QS_{k+1} + S_{k+1}(3S_{k+1}(2SS_{k+1} - S_{k+1}^2/(n+1))/(n+1) - 4CS_{k+1})/(n+1) = QS_{k+1} + \bar{x}_{k+1}(3\bar{x}_{k+1}(2SS_{k+1} - S_{k+1}\bar{x}_{k+1}) - 4CS_{k+1}) = QS_{k+1} + \bar{x}_{k+1}(3\bar{x}_{k+1}(2SS_{k+1} - (n+1)\bar{x}_{k+1}^2) - 4CS_{k+1})$ ⌒⌒ 436

The kurtosis can be calculated by using $QX_{k+1}$ and $SX_{k+1}$ $\gamma_{k+1}^{(2)} = \frac{(n+1)QX_{k+1}}{SX_{k+1}^2}$ ⌒⌒ 437

Fig. 4D

Incremental Algorithm 3:

$$SS_k = \sum_1^n x_i^2 \qquad 438$$

$$SS_{k+1} = \sum_1^n x_i^2 + x_a^2 \qquad 439$$

$SS_{k+1}$ can be calculated in an incremental way:

$$SS_{k+1} = SS_k + x_a^2 \qquad 440$$

$$SX_k = \sum_1^n (x_i - \bar{x}_k)^2 \qquad 441$$

$$SX_{k+1} = \sum_1^n (x_i - \bar{x}_{k+1})^2 + (x_a - \bar{x}_{k+1})^2 \qquad 442$$

$SX_{k+1}$ can be calculated by using $SS_{k+1}$ and $S_{k+1}$ or $\bar{x}_{k+1}$ $$SX_{k+1} = SS_{k+1} - S_{k+1}^2/(n+1) = SS_{k+1} - S_{k+1}\bar{x}_{k+1} = SS_{k+1} - (n+1)\bar{x}_{k+1}^2 \qquad 443$$

$$CS_k = \sum_1^n x_i^3 \qquad 444$$

$$CS_{k+1} = \sum_1^n x_i^3 + x_a^3 \qquad 445$$

$CS_{k+1}$ can be calculated in an incremental way:

$$CS_{k+1} = CS_k + x_a^3 \qquad 446$$

$$QS_k = \sum_1^n x_i^4 \qquad 447$$

$$QS_{k+1} = \sum_1^n x_i^4 + x_a^4 \qquad 448$$

$QS_{k+1}$ can be calculated in an incremental way:

$$QS_{k+1} = QS_k + x_a^4 \qquad 449$$

$$QX_k = \sum_1^n (x_i - \bar{x}_k)^4 \qquad 450$$

$$QX_{k+1} = \sum_1^n (x_i - \bar{x}_{k+1})^4 + (x_a - \bar{x}_{k+1})^4 \qquad 451$$

$QX_{k+1}$ can be calculated by using $QS_{k+1}, CS_{k+1}, SS_{k+1}$ and $S_{k+1}$ or $\bar{x}_{k+1}$ $$QX_{k+1} = QS_{k+1} + S_{k+1}\left(3S_{k+1}(2SS_{k+1} - S_{k+1}^2/(n+1))/(n+1) - 4CS_{k+1}\right)/(n+1) = QS_{k+1} + \bar{x}_{k+1}\left(3\bar{x}_{k+1}(2SS_{k+1} - S_{k+1}\bar{x}_{k+1}) - 4CS_{k+1}\right) = QS_{k+1} + \bar{x}_{k+1}\left(3\bar{x}_{k+1}(2SS_{k+1} - (n+1)\bar{x}_{k+1}^2) - 4CS_{k+1}\right) \qquad 452$$

$$\gamma_k^{(2)} = \frac{nQX_k}{SX_k^2} \qquad 453$$

The kurtosis can be calculated by using $QX_{k+1}$ and $SX_{k+1}$ $$\gamma_{k+1}^{(2)} = \frac{(n+1)QX_{k+1}}{SX_{k+1}^2} \qquad 454$$

Fig. 4E

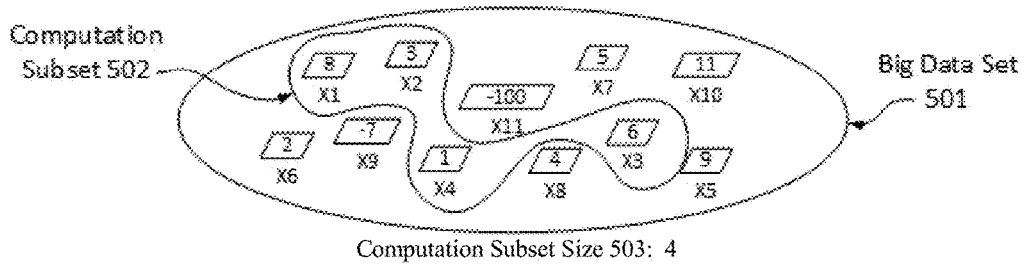

Computation Subset Size 503: 4

Calculate Kurtosis for Computation Subset 502

1. Use equation 402 to calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Calculate $\sum_1^4 (x_i - \bar{x}_1)^2$ for the 1st iteration:

$$\sum_1^4 (x_i - \bar{x}_1)^2 = (8-4.5)^2 + (3-4.5)^2 + (6-4.5)^2 + (1-4.5)^2 = 29$$

Operations in this step: 4 multiplications, 3 additions, 4 subtractions

3. Calculate $(\sum_1^4 (x_i - \bar{x}_1)^2)^2$ for the 1st iteration:

$$(\sum_1^4 (x_i - \bar{x}_1)^2)^2 = (29)^2 = 841$$

Operations in this step: 1 multiplication

4. Calculate $\sum_1^4 (x_i - \bar{x}_1)^4$ for the 1st iteration:

$$\sum_1^4 (x_i - \bar{x}_1)^4 = (8-4.5)^4 + (3-4.5)^4 + (6-4.5)^4 + (1-4.5)^4 = 310.25$$

Operations in this step: 8 multiplications, 3 additions, 4 subtractions

5. Use equation 403 to calculate the kurtosis $\gamma_1^{(2)}$ for the 1st iteration:

$$\gamma_1^{(2)} = \frac{4 \sum_1^4 (x_i - \bar{x}_1)^4}{(\sum_1^4 (x_i - \bar{x}_1)^2)^2} = \frac{4 \times 310.25}{841} = 1.4756242568370987$$

Operations in this step: 1 division, 1 multiplication

There are a total of 2 divisions, 14 multiplications, 9 additions and 8 subtractions.

Fig. 5A

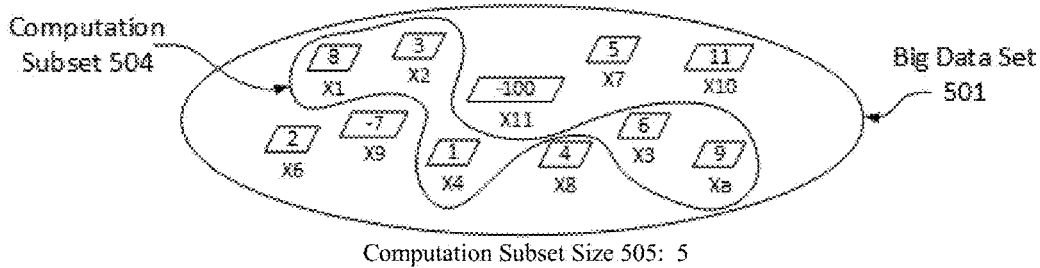

Computation Subset Size 505: 5

<u>Calculate Kurtosis for Computation Subset 504</u>

1. Calculate the $\bar{x}_2$ for the 2nd iteration:

$$\bar{x}_2 = \frac{\sum_1^4 x_i + x_a}{5} = \frac{8+3+6+1+9}{5} = 5.4$$

Operations in this step: 1 division, 4 additions

2. Calculate $\sum_1^4 (x_i - \bar{x}_2)^2 + (x_a - \bar{x}_2)^2$ for the 2nd iteration:

$\sum_1^4 (x_i - \bar{x}_2)^2 + (x_a - \bar{x}_2)^2 = (8 - 5.4)^2 + (3 - 5.4)^2 + (6 - 5.4)^2 + (1 - 5.4)^2 + (9 - 5.4)^2 = 45.2$ Operations in this step: 5 multiplications, 4 additions, 5 subtractions 3. Calculate $(\sum_1^4 (x_i - \bar{x}_2)^2 + (x_a - \bar{x}_2)^2)^2$ for the 2nd iteration:

$(\sum_1^4 (x_i - \bar{x}_2)^2 + (x_a - \bar{x}_2)^2)^2 = (45.2)^2 = 2043.04$

Operations in this step: 1 multiplication

4. Calculate $\sum_1^4 (x_i - \bar{x}_2)^4 + (x_a - \bar{x}_2)^4$ for the 2nd iteration:

$\sum_1^4 (x_i - \bar{x}_2)^4 + (x_a - \bar{x}_2)^4 = (8 - 5.4)^4 + (3 - 5.4)^4 + (6 - 5.4)^4 + (1 - 5.4)^4 + (9 - 5.4)^4 = 621.776$ Operations in this step: 10 multiplications, 4 additions, 5 subtractions 5. Calculate the kurtosis $\gamma_2^{(2)}$ for the 2nd iteration:

$$\gamma_2^{(2)} = \frac{5(\sum_1^4 (x_i - \bar{x}_2)^4 + (x_a - \bar{x}_2)^4)}{(\sum_1^4 (x_i - \bar{x}_2)^2 + (x_a - \bar{x}_2)^2)^2} = \frac{5 \times 621.776}{2043.04} = 1.5216931631294542$$

Operations in this step: 1 division, 1 multiplication

There are a total of 2 divisions, 17 multiplications, 12 additions and 10 subtractions.

Fig. 5A Cont'd 1

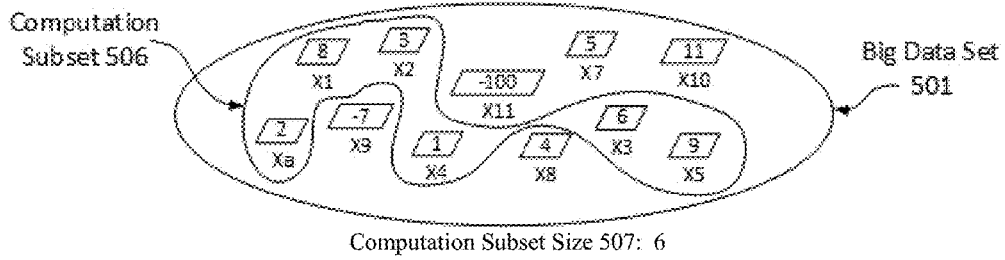

Computation Subset Size 507: 6

Calculate Kurtosis for Computation Subset 506

1. Calculate $\bar{x}_3$ for the 3$^{rd}$ iteration:

$$\bar{x}_3 = \frac{\sum_1^5 x_i + x_a}{6} = \frac{8+3+6+1+9+2}{6} = 4.8333333333333333$$

Operations in this step: 1 division, 5 additions

2. Calculate $\sum_1^5(x_i - \bar{x}_3)^2 + (x_a - \bar{x}_3)^2$ for the 3$^{rd}$ iteration:

$\sum_1^5(x_i - \bar{x}_3)^2 + (x_a - \bar{x}_3)^2 = (8 - 4.8333333333333333)^2 + (3 - 4.8333333333333333)^2 +$
$(6 - 4.8333333333333333)^2 + (1 - 4.8333333333333333)^2 + (9 - 4.8333333333333333)^2 +$
$(2 - 4.8333333333333333)^2 = 54.8333333333333334$ Operations in this step: 6 multiplications, 5 additions, 6 subtractions 3. Calculate $\left(\sum_1^5(x_i - \bar{x}_3)^2 + (x_a - \bar{x}_3)^2\right)^2$ for the 3$^{rd}$ iteration:

$\left(\sum_1^5(x_i - \bar{x}_3)^2 + (x_a - \bar{x}_3)^2\right)^2 = (54.8333333333333334)^2 = 3006.6944444444444518$ Operations in this step: 1 multiplication 4. Calculate $\sum_1^5(x_i - \bar{x}_3)^4 + (x_a - \bar{x}_3)^4$ for the 3$^{rd}$ iteration:

$\sum_1^5(x_i - \bar{x}_3)^4 + (x_a - \bar{x}_3)^4 = (8 - 4.8333333333333333)^4 + (3 - 4.8333333333333333)^4 +$
$(6 - 4.8333333333333333)^4 + (1 - 4.8333333333333333)^4 + (9 - 4.8333333333333333)^4 +$
$(2 - 4.8333333333333333)^4 = 695.4861111111111139$ Operations in this step: 12 multiplications, 5 additions, 6 subtractions 5. Calculate the kurtosis $\gamma_3^{(2)}$ for the 3$^{rd}$ iteration:

$$\gamma_3^{(2)} = \frac{6(\sum_1^5(x_i - \bar{x}_3)^4 + (x_a - \bar{x}_3)^4)}{(\sum_1^5(x_i - \bar{x}_3)^2 + (x_a - \bar{x}_3)^2)^2} = \frac{6 \times 695.4861111111111139}{3006.6944444444444518} = 1.3878752044049852$$

Operations in this step: 1 division, 1 multiplication

There are a total of 2 divisions, 20 multiplications, 15 additions and 12 subtractions.

The traditional algorithms for calculating kurtosis on $n$ data elements will typically take 2 divisions, $3n+2$ multiplications, $3(n-1)$ additions and $2n$ subtractions.

Fig. 5A Cont'd 2

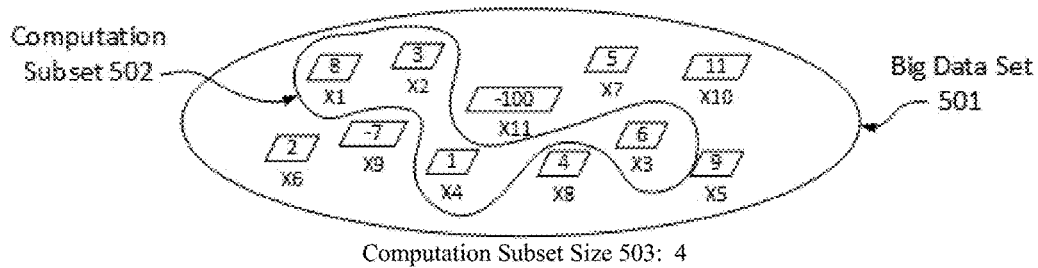

Computation Subset Size 503: 4

Calculate Kurtosis for Computation Subset 502

Incremental Algorithm 1:

1. Use equation 402 to calculate $\bar{x}_1$ for the 1$^{st}$ iteration:

$$\bar{x}_1 = \frac{\sum_1^4 x_i}{4} = \frac{8+3+6+1}{4} = 4.5$$

Operations in this step: 1 division, 3 additions

2. Use equation 409 to calculate $SS_1$ for the 1$^{st}$ iteration:

$$SS_1 = \sum_1^4 x_i^2 = 8^2 + 3^2 + 6^2 + 1^2 = 110$$

Operations in this step: 4 multiplications, 3 additions

3. Use equation 412 to calculate $SX_1$ for the 1$^{st}$ iteration:

$$SX_1 = \sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

4. Use equation 415 to calculate $CS_1$ for the 1$^{st}$ iteration:

$$CS_1 = \sum_1^4 x_i^3 = 8^3 + 3^3 + 6^3 + 1^3 = 756$$

Operations in this step: 8 multiplications, 3 additions

5. Use equation 418 to calculate $QX_1$ for the 1$^{st}$ iteration:

$$QX_1 = \sum_1^4 (x_i - \bar{x}_1)^4 = (8 - 4.5)^4 + (3 - 4.5)^4 + (6 - 4.5)^4 + (1 - 4.5)^4 = 310.25$$

Operations in this step: 8 multiplications, 3 additions, 4 subtractions

6. Use equation 421 to calculate the kurtosis $\gamma_1^{(2)}$ for the 1$^{st}$ iteration:

$$\gamma_1^{(2)} = \frac{4QX_1}{SX_1^2} = \frac{4 \times 310.25}{29^2} = 1.4756242568370987$$

Operations in this step: 1 division, 2 multiplications.

There are a total of 2 divisions, 26 multiplications, 15 additions and 8 subtractions.

Fig. 5B

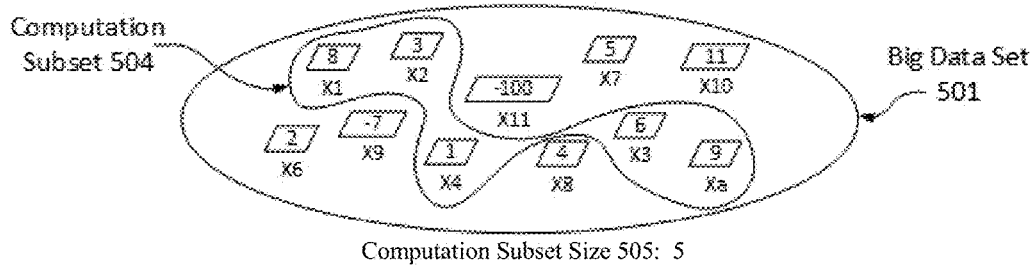

Computation Subset Size 505: 5

<u>Calculate Kurtosis for Computation Subset 504</u>

Incremental Algorithm 1:

1. Use equation 408 to calculate $\bar{x}_2$ and keep $\bar{x}_2^2$ value for the 2$^{nd}$ iteration:

$\bar{x}_2 = \frac{4\bar{x}_1 + x_a}{4+1} = \frac{4 \times 4.5 + 9}{5} = 5.4$,    $\bar{x}_2^2 = 5.4^2 = 29.16$    (keep 4+1 value)

Operations in this step: 1 division, 2 multiplications, 2 additions

2. Use equation 411 to calculate $SS_2$ and equation 414 to calculate $SX_2$ for the 2$^{nd}$ iteration:

$SS_2 = SS_1 + x_a^2 = 110 + 9^2 = 191$    (keep $x_a^2$ value)

$SX_2 = SS_2 - (4+1)\bar{x}_2^2 = 191 - 5 \times 5.4^2 = 45.2$

Operations in this step: 2 multiplications, 1 addition, 1 subtraction

3. Use equation 417 to calculate $CS_2$ for the 2$^{nd}$ iteration:

$CS_2 = CS_1 + x_a^3 = 756 + 9^3 = 1485$    (keep $x_a^3$ value)

Operations in this step: 1 multiplication, 1 addition (use $x_a^2$ calculated in step 2)

4. Use equation 420 to calculate $QX_2$ for the 2$^{nd}$ iteration:

$QX_2 = QX_1 + (x_a - \bar{x}_2)\left(x_a^3 - 3\bar{x}_2(x_a^2 - \bar{x}_2(x_a + \bar{x}_2))\right) + (\bar{x}_1 - \bar{x}_2)\left(4CS_1 + 3(\bar{x}_1 + \bar{x}_2)(4(\bar{x}_1^2 + \bar{x}_2^2) - 2SS_1)\right) = 310.25 + (9 - 5.4)\left(9^3 - 3 \times 5.4 \times (9^2 - 5.4 \times (9 + 5.4))\right) + (4.5 - 5.4)\left(4 \times 756 + 3 \times (4.5 + 5.4)(4 \times (4.5^2 + 5.4^2) - 2 \times 110)\right) = 621.776$ Operations in this step: 10 multiplications, 6 additions, 5 subtractions (use previously kept values)

5. Use equation 421 to calculate the kurtosis $\gamma_2^{(2)}$ for the 2$^{nd}$ iteration:

$\gamma_2^{(2)} = \frac{(4+1)QX_2}{SX_2^2} = \frac{5 \times 621.776}{45.2^2} = 1.5216931631294541$ Operations in this step: 1 division, 2 multiplications (use 4+1 calculated in step 1)

There are a total of 2 divisions, 17 multiplications, 10 additions and 6 subtractions.

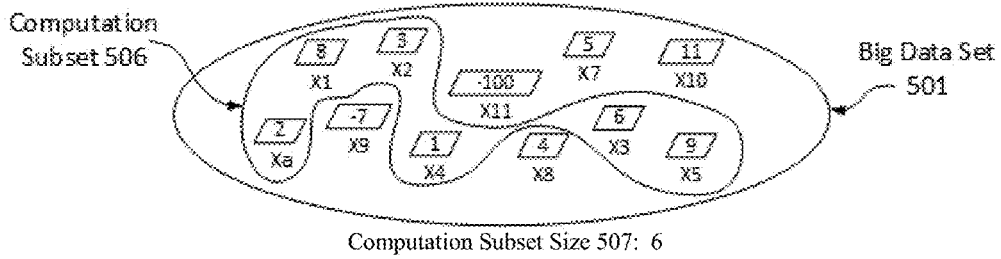

Computation Subset Size 507: 6

<u>Calculate Kurtosis for Computation Subset 506</u>

Incremental Algorithm 1:

1. Use equation 408 to calculate $\bar{x}_3$ and keep $\bar{x}_3^2$ value for the 3$^{rd}$ iteration:

$\bar{x}_3 = \frac{5\bar{x}_2 + x_a}{5+1} = \frac{5 \times 5.4 + 2}{6} = 4.8333333333333333$, $\bar{x}_3^2 = 23.361111111111111$ (keep 5+1 value)

Operations in this step: 1 division, 2 multiplications, 2 additions

2. Use equation 411 to calculate $SS_3$ and equation 414 to calculate $SX_3$ for the 3$^{rd}$ iteration:

$SS_3 = SS_2 + x_a^2 = 191 + 2^2 = 195$ (keep $x_a^2$ value)

$SX_3 = SS_3 - (5+1)\bar{x}_3^2 = 195 - 6 \times 4.8333333333333333^2 = 54.8333333333333353$ Operations in the two steps: 2 multiplications, 1 addition, 1 subtraction (use $\bar{x}_3^2$ and 5+1 calculated in step 1)

3. Use equation 417 to calculate $CS_3$ for the 3$^{rd}$ iteration:

$CS_3 = CS_2 + x_a^3 = 1485 + 2^3 = 1493$ (keep $x_a^3$)

Operations in this step: 1 multiplication, 1 addition (use $x_a^2$ calculated in step 2)

4. Use equation 420 to calculate $QX_3$ for the 3$^{rd}$ iteration:

$QX_3 = QX_2 + (x_a - \bar{x}_3)\left(x_a^3 - 3\bar{x}_3(x_a^2 - \bar{x}_3(x_a + \bar{x}_3))\right) + (\bar{x}_2 - \bar{x}_3)\left(4CS_2 + 3(\bar{x}_2 + \bar{x}_3)(5(\bar{x}_2^2 + \bar{x}_3^2) - 2SS_2)\right) = 621.776 + (2 - 4.83333333333)\left(2^3 - 3 \times 4.83333333333(2^2 - 4.83333333333(2 + 4.83333333333))\right) + (5.4 - 4.83333333333)(4 \times 1485 + 3 \times (5.4 + 4.83333333333)(5 \times (5.4^2 + 4.83333333333^2) - 2 \times 191)) = 695.4861111111112046$ Operations in this step: 10 multiplications, 6 additions, 5 subtractions 5. Use equation 421 to calculate the kurtosis $\gamma_3^{(2)}$ for the 3$^{rd}$ iteration:

$\gamma_3^{(2)} = \frac{(5+1)QX_3}{SX_3^2} = \frac{6 \times 695.4861111111112046}{54.8333333333333353^2} = 1.3878752044049853$ Operations in this step: 1 division, 2 multiplications (use 5+1 calculated in step 1)

There are a total of 2 divisions, 17 multiplications, 10 additions and 6 subtractions.

Fig. 5B Cont'd 2

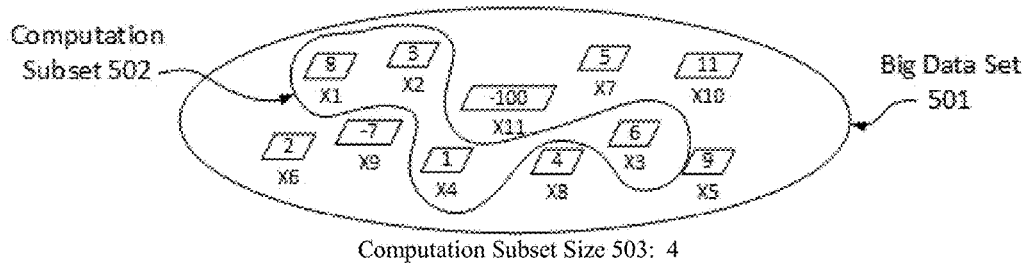

Computation Subset Size 503: 4

<u>Calculate Kurtosis for Computation Subset 502</u>

Incremental Algorithm 2:

1. Use equation 402 to calculate $\bar{x}_1$ for the 1st iteration:

$$\bar{x}_1 = \frac{\sum_1^4 x_i}{4} = \frac{8+3+6+1}{4} = 4.5$$

Operations in this step: 1 division, 3 additions

2. Use equation 422 to calculate $SS_1$ and equation 425 to calculate $SX_1$ for the 1st iteration:

$$SS_1 = \sum_1^4 x_i^2 = 8^2 + 3^2 + 6^2 + 1^2 = 110 \quad \text{(keep each value)}$$

$$SX_1 = \sum_1^4 (x_i - \bar{x}_1)^2 = (8 - 4.5)^2 + (3 - 4.5)^2 + (6 - 4.5)^2 + (1 - 4.5)^2 = 29 \text{ (keep each value)}$$

Operations in the two steps: 8 multiplications, 6 additions, 4 subtractions

3. Use equation 428 to calculate $CS_1$ for the 1st iteration:

$$CS_1 = \sum_1^4 x_i^3 = 8^3 + 3^3 + 6^3 + 1^3 = 756$$

Operations in this step: 4 multiplications, 3 additions

4. Use equation 431 to calculate $QS_1$ for the 1st iteration:

$$QS_1 = \sum_1^4 x_i^4 = 8^4 + 3^4 + 6^4 + 1^4 = 5474$$

Operations in this step: 4 multiplications, 3 additions

5. Use equation 434 to calculate $QX_1$ for the 1st iteration:

$$QX_1 = \sum_1^4 (x_i - \bar{x}_1)^4 = (8 - 4.5)^4 + (3 - 4.5)^4 + (6 - 4.5)^4 + (1 - 4.5)^4 = 310.25$$

Operations in this step: 4 multiplications, 3 additions (use previously kept values)

6. Use equation 437 to calculate the kurtosis $\gamma_1^{(2)}$ for the 1st iteration:

$$\gamma_1^{(2)} = \frac{4QX_1}{SX_1^2} = \frac{4 \times 310.25}{29^2} = 1.47562425683 70987$$

Operations in this step: 1 division, 2 multiplications.

There are a total of 2 divisions, 22 multiplications, 18 additions and 4 subtractions.

Fig. 5C

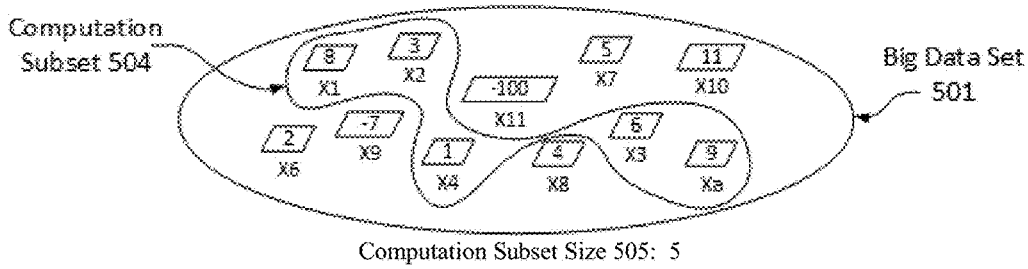

Computation Subset Size 505: 5

<u>Calculate Kurtosis for Computation Subset 504</u>

Incremental Algorithm 2:

1. Use equation 408 to calculate $\bar{x}_2$ and keep $\bar{x}_2^2$ value for the 2$^{nd}$ iteration:

$\bar{x}_2 = \frac{4\bar{x}_1 + x_a}{4+1} = \frac{4 \times 4.5 + 9}{5} = 5.4$ (keep 4+1)   $\bar{x}_2^2 = 5.4 \times 5.4 = 29.16$ Operations in the two steps: 1 division, 2 multiplications, 2 additions 2. Use equation 424 to calculate $SS_2$ and equation 427 to calculate $SX_2$ for the 2$^{nd}$ iteration $SS_2 = SS_1 + x_a^2 = 110 + 9^2 = 191$   (keep $x_a^2$ value)

$SX_2 = SX_1 + (x_a - \bar{x}_2)(x_a - \bar{x}_1) = 29 + (9 - 5.4)(9 - 4.5) = 45.2$ Operations in the two steps: 2 multiplications, 2 additions, 2 subtractions 3. Use equation 430 to calculate $CS_2$ for the 2$^{nd}$ iteration $CS_2 = CS_1 + x_a^3 = 756 + 9^3 = 1485$ Operations in this step: 1 multiplication, 1 addition (use previously calculated $x_a^2$ for $x_a^3$)

4. Use equation 433 to calculate $QS_2$ for the 2$^{nd}$ iteration $QS_2 = QS_1 + x_a^4 = 5474 + 9^4 = 12035$ Operations in this step: 1 multiplication, 1 addition (use previously calculated $x_a^2$ for $x_a^4$)

5. Use equation 436 to calculate $QX_2$ for the 2$^{nd}$ iteration $QX_2 = QS_2 + \bar{x}_2(3\bar{x}_2(2SS_2 - (4+1)\bar{x}_2^2) - 4CS_2) = 12035 + 5.4 \times (3 \times 5.4 \times (2 \times 191 - (4+1) \times 29.16) - 4 \times 1485) = 12035 + 5.4 \times (16.2 \times (382 - 5 \times 29.16) - 5940) = 12035 + 5.4 \times (16.2 \times (382 - 145.8) - 5940) = 12035 + 5.4 \times (16.2 \times 236.2 - 5940) = 12035 + 5.4 \times (3826.44 - 5940) = 12035 + 5.4 \times (-2113.56) = 12035 + (-11413.224) = 621.776$ Operations in this step: 6 multiplications, 1 addition, 2 subtractions (use previous $\bar{x}_2^2$ and 4+1)

6. Use equation 437 to calculate the kurtosis $\gamma_2^{(2)}$ for the 2$^{nd}$ iteration $\gamma_2^{(2)} = \frac{(4+1)QX_2}{SX_2^2} = \frac{5 \times 621.776}{45.2^2} = 1.5216931631294541$ Operations in this step: 1 division, 2 multiplications (use 4+1 calculated in step 1).
There are a total of 2 divisions, 14 multiplications, 7 additions and 4 subtractions.

Fig. 5C Cont'd 1

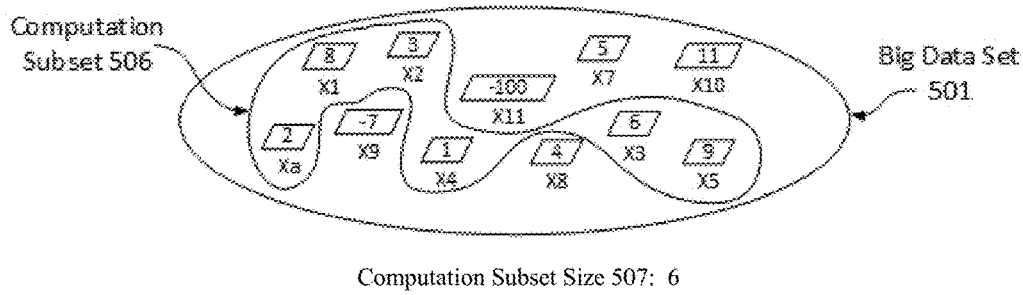

Computation Subset Size 507: 6

<u>Calculate Kurtosis for Computation Subset 506</u>

Incremental Algorithm 2:

1. Use equation 408 to calculate $\bar{x}_3$ and keep $\bar{x}_3^2$ value for the 3rd iteration:

$\bar{x}_3 = \frac{5\bar{x}_2 + x_a}{5+1} = \frac{5 \times 5.4 + 2}{6} = 4.8333333333333333$ (keep 5+1) $\quad \bar{x}_3^2 = 23.36111111111111$ Operations in the two steps: 1 division, 2 multiplications, 2 additions 2. Use equation 424 to calculate $SS_3$ and equation 427 to calculate $SX_3$ for the 3rd iteration:

$SS_3 = SS_2 + x_a^2 = 191 + 2^2 = 195$ (keep $x_a^2$)

$SX_3 = SX_2 + (x_a - \bar{x}_3)(x_a - \bar{x}_2) = 45.2 + (2 - 4.8333333)(2 - 5.4) = 54.8333333333333332$ Operations in the two steps: 2 multiplications, 2 additions, 2 subtractions 3. Use equation 430 to calculate $CS_3$ for the 3rd iteration $CS_3 = CS_2 + x_a^3 = 1485 + 2^3 = 1493$ Operations in this step: 1 multiplication, 1 addition (use previously calculated $x_a^2$)

4. Use equation 433 to calculate $QS_3$ for the 3rd iteration $QS_3 = QS_2 + x_a^4 = 12035 + 2^4 = 12051$ Operations in this step: 1 multiplication, 1 addition (use previously calculated $x_a^2$)

5. Use equation 436 to calculate $QX_3$ for the 3rd iteration $QX_3 = QS_3 + \bar{x}_3(3\bar{x}_3(2SS_3 - (5+1)\bar{x}_3^2) - 4CS_3) = 12051 + 4.8333333333333333 \times$
$(3 \times 4.8333333333333333 \times (2 \times 195 - (5+1) \times 4.8333333333333333^2) - 4 \times 1493) =$
$12051 + 4.8333333333333333 \times (14.4999999999999999 \times 249.83333333333334 - 5972) =$
$695.4861111111111975$ Operations in this step: 6 multiplications, 1 addition, 2 subtractions (use $\bar{x}_3^2$ and 5+1 in step 1)

6. Use equation 436 to calculate the kurtosis $\gamma_3^{(2)}$ for the 3rd iteration $\gamma_3^{(2)} = \frac{(5+1)QX_3}{SX_3^2} = \frac{6 \times 695.4861111111111975}{54.8333333333333332^2} = 1.3878752044049854$ Operations in this step: 1 division, 2 multiplications (use 5+1 calculated in step 1)
There are a total of 2 divisions, 14 multiplications, 7 additions and 4 subtractions.

Fig. 5C Cont'd 2

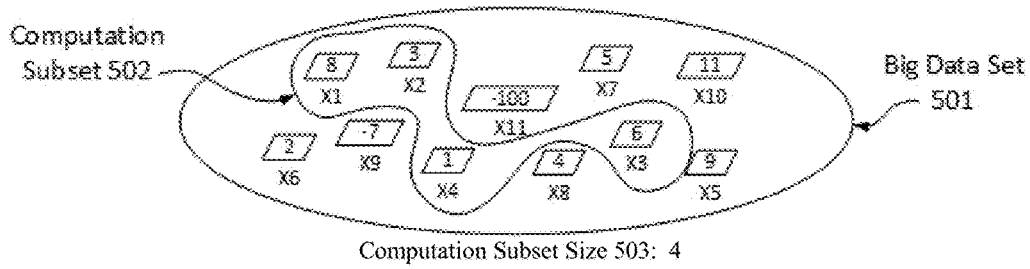

Computation Subset Size 503: 4

Calculate Kurtosis for Computation Subset 502

Incremental Algorithm 3:

1. Use equation 402 to calculate $\bar{x}_1$ for the 1st iteration:

$$\bar{x}_1 = \frac{\sum_1^4 x_i}{4} = \frac{8+3+6+1}{4} = 4.5$$

Operations in this step: 1 division, 3 additions

2. Use equation 438 to calculate $SS_1$ and equation 441 to calculate $SX_1$ for the 1st iteration:

$$SS_1 = \sum_1^4 x_i^2 = 8^2 + 3^2 + 6^2 + 1^2 = 110 \quad \text{(keep } 8^2, 3^2, 6^2, 1^2)$$

$$SX_1 = \sum_1^4 (x_i - \bar{x}_1)^2 = (8 - 4.5)^2 + (3 - 4.5)^2 + (6 - 4.5)^2 + (1 - 4.5)^2 = 29 \quad \text{(keep all values)}$$

Operations in the two steps: 8 multiplications, 6 additions, 4 subtractions

3. Use equation 444 to calculate $CS_1$ for the 1st iteration:

$$CS_1 = \sum_1^4 x_i^3 = 8^3 + 3^3 + 6^3 + 1^3 = 756$$

Operations in this step: 4 multiplications, 3 additions (use values kept in step 2)

4. Use equation 447 to calculate $QS_1$ for the 1st iteration:

$$QS_1 = \sum_1^4 x_i^4 = 8^4 + 3^4 + 6^4 + 1^4 = 5474$$

Operations in this step: 4 multiplications, 3 additions (use values kept in step 2)

5. Use equation 450 to calculate $QX_1$ for the 1st iteration:

$$QX_1 = \sum_1^4 (x_i - \bar{x}_1)^4 = (8 - 4.5)^4 + (3 - 4.5)^4 + (6 - 4.5)^4 + (1 - 4.5)^4 = 310.25$$

Operations in this step: 4 multiplications, 3 additions (use values kept in step 2)

6. Use equation 453 to calculate the kurtosis $\gamma_1^{(2)}$ for the 1st iteration:

$$\gamma_1^{(2)} = \frac{4QX_1}{SX_1^2} = \frac{4 \times 310.25}{29^2} = 1.4756242568370987$$

Operations in this step: 1 division, 2 multiplications.

There are a total of 2 divisions, 22 multiplications, 18 additions and 4 subtractions.

Fig. 5D

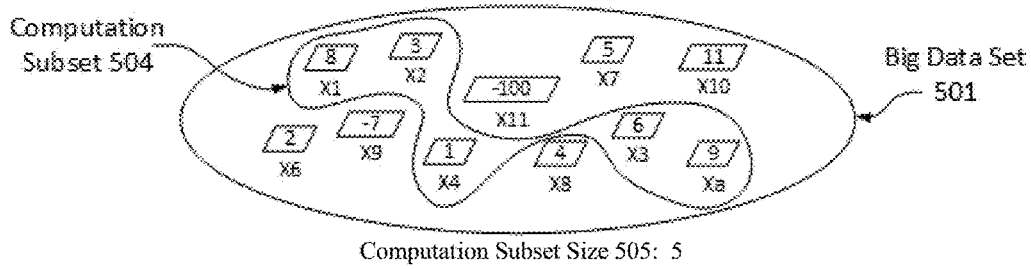

Computation Subset Size 505: 5

Calculate Kurtosis for Computation Subset 504

Incremental Algorithm 3:

1. Use equation 408 to calculate $\bar{x}_2$ and keep $\bar{x}_2^2$ value for the 2$^{nd}$ iteration:

$$\bar{x}_2 = \frac{4\bar{x}_1 + x_a}{4+1} = \frac{4 \times 4.5 + 9}{5} = 5.4 \quad (\text{keep } 4+1) \qquad \bar{x}_2^2 = 5.4 \times 5.4 = 29.16$$

Operations in the two steps: 1 division, 2 multiplications, 2 additions

2. Use equation 440 to calculate $SS_2$ and equation 443 to calculate $SX_2$ for the 2$^{nd}$ iteration:

$$SS_2 = SS_1 + x_a^2 = 110 + 9^2 = 191 \quad (\text{keep } x_a^2)$$

$$SX_2 = SS_2 - (4+1)\bar{x}_2^2 = 191 - 5 \times 5.4^2 = 45.2$$

Operations in the two steps: 2 multiplications, 1 addition, 1 subtraction (use results kept in step 1)

3. Use equation 446 to calculate $CS_2$ for the 2$^{nd}$ iteration:

$$CS_2 = CS_1 + x_a^3 = 756 + 9^3 = 1485$$

Operations in this step: 1 multiplication, 1 addition (use $x_a^2$ calculated in step 2)

4. Use equation 449 to calculate $QS_2$ for the 2$^{nd}$ iteration:

$$QS_2 = QS_1 + x_a^4 = 5474 + 9^4 = 12035$$

Operations in this step: 1 multiplication, 1 addition (use $x_a^2$ calculated in step 2)

5. Use equation 452 to calculate $QX_2$ for the 2$^{nd}$ iteration:

$$QX_2 = QS_2 + \bar{x}_2(3\bar{x}_2(2SS_2 - (4+1)\bar{x}_2^2) - 4CS_2) = 12035 + 5.4 \times (3 \times 5.4 \times (2 \times 191 - (4+1) \times 29.16) - 4 \times 1485) = 12035 + 5.4 \times (16.2 \times (382 - 5 \times 29.16) - 5940) = 12035 + 5.4 \times (16.2 \times (382 - 145.8) - 5940) = 12035 + 5.4 \times (16.2 \times 236.2 - 5940) = 12035 + 5.4 \times (3826.44 - 5940) = 12035 + 5.4 \times (-2113.56) = 12035 + (-11413.224) = 621.776$$

Operations in this step: 6 multiplications, 1 addition, 2 subtractions (use $\bar{x}_2^2$ and 4+1 in step 1)

6. Use equation 454 to calculate the kurtosis $\gamma_2^{(2)}$ for the 2$^{nd}$ iteration:

$$\gamma_2^{(2)} = \frac{(4+1)QX_2}{SX_2^2} = \frac{5 \times 621.776}{45.2^2} = 1.5216931631294541$$

Operations in this step: 1 division, 2 multiplications (use 4+1 calculated in step 1)
There are a total of 2 divisions, 14 multiplications, 6 additions and 3 subtractions.

Fig. 5D Cont'd 1

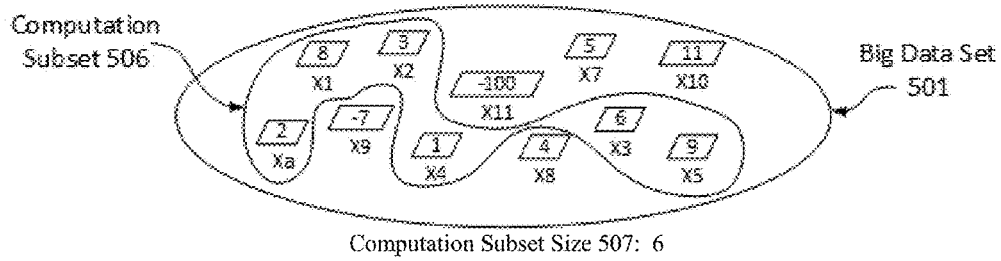

Computation Subset Size 507: 6

Calculate Kurtosis for Computation Subset 506

Incremental Algorithm 3:

1. Use equation 407 to calculate $\bar{x}_3$ and keep $\bar{x}_3^2$ value for the 3$^{rd}$ iteration $\bar{x}_3 = \frac{5\bar{x}_2 + x_a}{5+1} = \frac{5 \times 5.4 + 2}{6} = 4.8333333333333333$ (keep 5+1)   $\bar{x}_3^2 = 23.36111111111111$ Operations in the two steps: 1 division, 2 multiplications, 2 additions 2. Use equation 439 to calculate $SS_3$ and equation 442 to calculate $SX_3$ for the 3$^{rd}$ iteration $SS_3 = SS_2 + x_a^2 = 191 + 2^2 = 195$   (keep $x_a^2$)

$SX_3 = SS_3 - (5+1)\bar{x}_3^2 = 195 - 6 \times 4.8333333333333333^2 = 54.8333333333333353$ Operations in the two step: 2 multiplications, 1 addition, 1 subtraction (use 5+1 calculated in step 1)

3. Use equation 445 to calculate $CS_3$ for the 3$^{rd}$ iteration $CS_3 = CS_2 + x_a^3 = 1485 + 2^3 = 1493$   (use $x_a^2$ calculated in step 2)

Operations in this step: 1 multiplication, 1 addition

4. Use equation 448 to calculate $QS_3$ for the 3$^{rd}$ iteration $QS_3 = QS_2 + x_a^4 = 12035 + 2^4 = 12051$ Operations in this step: 1 multiplication, 1 addition (use $x_a^2$ calculated in step 2)

5. Use equation 451 to calculate $QX_3$ for the 3$^{rd}$ iteration $QX_3 = QS_3 + \bar{x}_3(3\bar{x}_3(2SS_3 - (5+1)\bar{x}_3^2) - 4CS_3) = 12051 + 4.8333333333333333 \times$
$(3 \times 4.8333333333333333 \times (2 \times 195 - (5+1) \times 4.8333333333333333^2) - 4 \times 1493) =$
$12051 + 4.8333333333333333 \times (14.4999999999999999 \times 249.83333333333334 - 5972) =$
$695.4861111111111975$ Operations in this step: 6 multiplications, 1 addition, 2 subtractions (use $\bar{x}_3^2$ and 5+1 in step 1)

6. Use equation 453 to calculate the kurtosis $\gamma_3^{(2)}$ for the 3$^{rd}$ iteration $\gamma_3^{(2)} = \frac{(5+1)QX_3}{SX_3^2} = \frac{6 \times 695.4861111111111975}{54.8333333333333353^2} = 1.3878752044049853$ Operations in this step: 1 division, 2 multiplications (use 5+1 calculated in step 1).
There are a total of 2 divisions, 14 multiplications, 6 additions and 3 subtractions.

Fig. 5D Cont'd 2

|  | Division | Multiplication | Addition | Subtraction |
|---|---|---|---|---|
| Traditional Algorithm | 2 | 20 | 15 | 12 |
| Incremental Algorithm 1 | 2 | 17 | 10 | 6 |
| Incremental Algorithm 2 | 2 | 14 | 7 | 4 |
| Incremental Algorithm 3 | 2 | 14 | 6 | 3 |

|  | Division | Multiplication | Addition | Subtraction |
|---|---|---|---|---|
| Traditional Algorithm | 2 | 3,000,002 | 2,999,997 | 2,000,000 |
| Incremental Algorithm 1 | 2 | 17 | 10 | 6 |
| Incremental Algorithm 2 | 2 | 14 | 7 | 4 |
| Incremental Algorithm 3 | 2 | 14 | 6 | 3 |

INCREMENTAL KURTOSIS CALCULATION FOR BIG DATA OR STREAMED DATA USING COMPONENTS

CROSS-REFERENCE TO RELATED APPLICATIONS

This application claims the benefit of provisional patent application Ser. No. 62/089,235, filed 2014 Dec. 9 by the present inventor.

BACKGROUND AND RELEVANT ART

Internet, mobile communications, navigation, online gaming, sensing technologies and large scale computing infrastructures are producing large amount of data every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require streaming processing due to their nature, e.g., audio, video and digital TV, etc.

Processing Big Data or streamed data may include performing calculations on multiple data elements. When performing some statistical calculations on Big Data or streamed data, the number of data elements to be accessed may be quite large. For example, when calculating a kurtosis a (potentially large) number of data elements may need to be accessed.

Further, some kurtosis calculations are recalculated as new data are added to a Big Data set or new streamed data elements are received. Thus, the (potentially large) number of data elements may be repeatedly accessed. For example, it may be that a kurtosis is used for a computation subset whose size n keeps increasing to include the newly received data element. As such, every time a new data element is received, the new element is added to the computation subset. The n+1 data elements in the modified computation subset are then accessed to recalculate the kurtosis.

When performing a kurtosis calculation on n+1 data elements using traditional methods, all the n+1 data elements in the computation subset will be visited and used.

In addition, algorithms on streamed data processing may be extended to Big Data processing, because Big Data sets are accumulated over time and they may be considered as a data stream with irregular time intervals. Depending on necessity, the computation subset size n may be extremely large, so the data elements in a computation subset may be distributed over a cloud comprising hundreds of thousands of computing devices. Re-performing a kurtosis calculation on Big Data sets after some data changing in traditional ways results in slow response and significant waste of computing resources.

BRIEF SUMMARY

The present disclosure describes methods, systems, and computing system program products for incrementally calculating a kurtosis for Big Data or streamed data. A computing system comprises one or more computing devices. Each of the computing devices comprises one or more processors. The computing system comprises one or more storage media. The computing system has stored a data set on the one or more storage media or has access to a data stream. The computing system maintains a computation subset size counter. The computation subset size counter indicates the number of data elements in a computation subset of the data set or the data stream. Embodiments of the invention include incrementally calculating one or more components of a kurtosis for a modified computation subset based on one or more components calculated for the previous computation subset and then calculating the kurtosis for the modified computation subset based on one or more of the incrementally calculated components. Incrementally calculating kurtosis not only avoids visiting all the data element in the computation subset but also avoids storing the whole computation subset as traditional algorithms would do, and thus improves the calculation efficiency, saves computing resources and reduces computing system's power consumption. The computing system may also optionally include a data buffer for storing accessed or received data elements.

The computing system incrementally calculates one or more components of a kurtosis starting from either an empty computation subset or a non-empty computation subset if one or more components have already been calculated.

The computing system initializes a computation subset size counter and one or more ($v(1 \leq v \leq p)$) components of a kurtosis.

The computing system accesses or receives a Big Data or streamed data element or information about (e.g., index or address of) a data element to be added to the computation subset.

The computing system stores the accessed or received data element into an optional data buffer as needed.

The computing system modifies the computation subset by adding the accessed or received data element to the computation subset and modifies the computation subset size by increasing its value by 1.

The computing system directly incrementally calculates one or more ($v(1 \leq v \leq p)$) components of a kurtosis for the modified computation subset. Directly incrementally calculating the v components of a kurtosis includes directly incrementally calculating each of the v components one by one. Directly incrementally calculating a component includes: accessing the component calculated for the prior computation subset and adding a contribution of the added data element to the component mathematically.

The computing system indirectly incrementally calculating w=p−v components as needed: indirectly incrementally calculating the w components includes indirectly incrementally calculating each of the w components one by one. Indirectly incrementally calculating a component includes calculating the component using one or more components other than the component itself. The one or more components may have been initialized, directly incrementally calculated or indirectly incrementally calculated.

The computing system generates a kurtosis as needed based on one or more incrementally calculated components.

The computing system may keep accessing or receiving a data element to be added to the computation subset, storing the accessed or received data element into an optional data buffer as needed, modifying the computation subset and the computation subset size, directly incrementally calculating v (1≤v≤p) components, indirectly incrementally calculating w=p−v components as needed and generating a kurtosis as needed, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of a kurtosis and traditional equations for calculating a kurtosis.

FIG. 4B illustrates some example components of a kurtosis and basic incremental component calculation equations.

FIG. 4C illustrates the equations of the first example incremental kurtosis calculation algorithm (incremental algorithm 1).

FIG. 4D illustrates the equations of the second example incremental kurtosis calculation algorithm (incremental algorithm 2).

FIG. 4E illustrates the equations of the third example incremental kurtosis calculation algorithm (incremental algorithm 3).

FIG. 5A illustrates an example of calculating kurtosis using traditional algorithms as shown in FIG. 4A.

FIG. 5B illustrates an example of calculating kurtosis using incremental algorithm 1 as shown in FIG. 4C.

FIG. 5C illustrates an example of calculating kurtosis using incremental algorithm 2 as shown in FIG. 4D.

FIG. 5D illustrates an example of calculating kurtosis using incremental algorithm 3 as shown in FIG. 4E.

FIG. 6 illustrates computational loads for traditional algorithms and incremental algorithms with a computation subset of size 4.

FIG. 7 illustrates computational loads for traditional algorithms and incremental algorithms with a computation subset of size 1,000,000.

DETAILED DESCRIPTION

Figure 1:
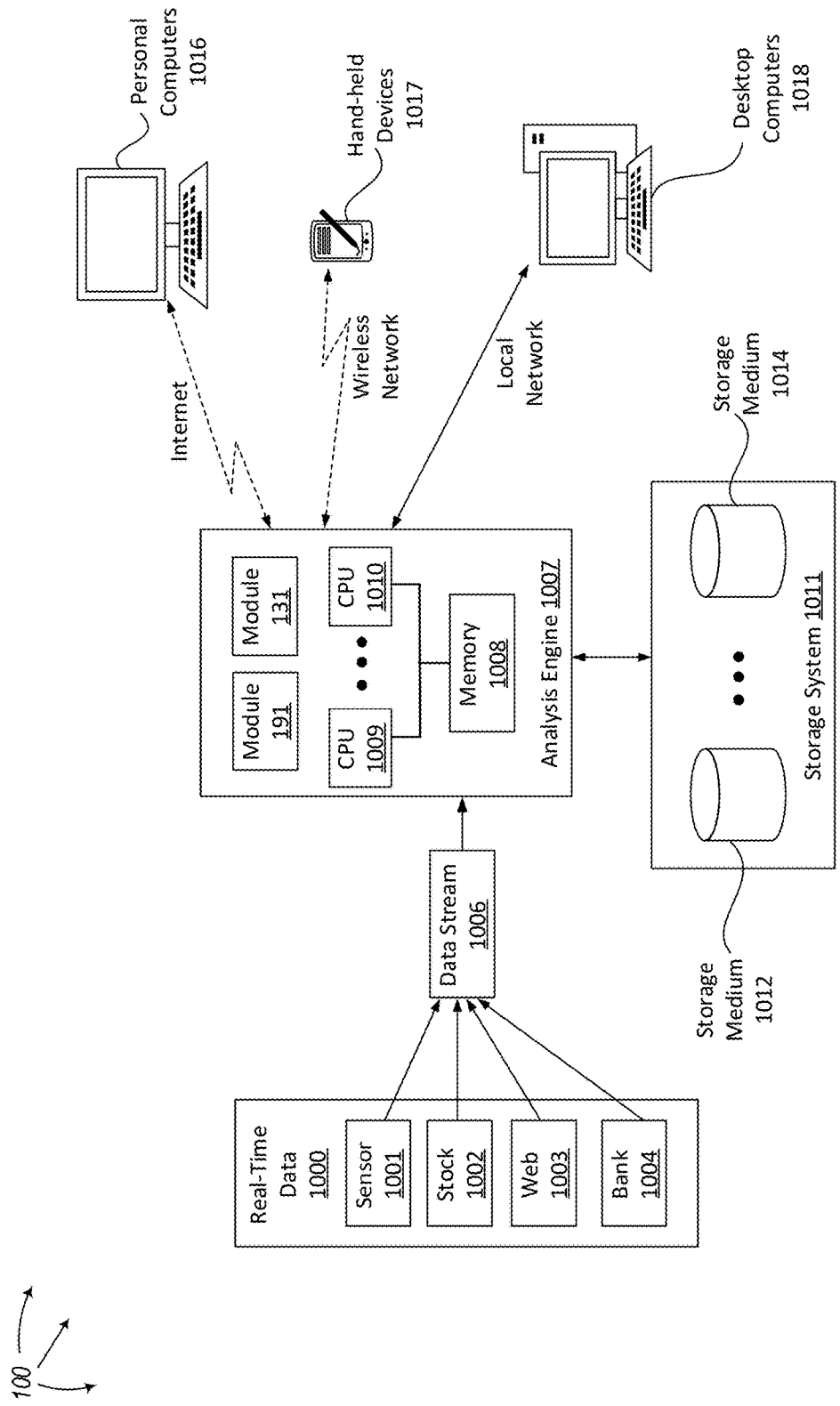
FIG. 1 illustrates a high-level overview of an example computing system that facilitates incrementally calculating kurtosis for Big Data or streamed data.

The present disclosure describes methods, systems, and computing system program products for incrementally calculating a kurtosis for Big Data or streamed data. A computing system comprises one or more computing devices. Each of the computing devices comprises one or more processors. The computing system comprises one or more storage media. The computing system has stored a data set on the one or more storage media or has access to a data stream. The computing system maintains a computation subset size counter. The computation subset size counter indicates the number of data elements in a computation subset of the data set or the data stream. Embodiments of the invention include incrementally calculating one or more components of a kurtosis for a modified computation subset based on one or more components calculated for the previous computation subset and then calculating the kurtosis for the modified computation subset based on one or more of the incrementally calculated components. Incrementally calculating kurtosis not only avoids visiting all the data element in the computation subset but also avoids storing the whole computation subset as traditional algorithms would do, and thus improves the calculation efficiency, saves computing resources and reduces computing system's power consumption. The computing system may also optionally include a data buffer for storing accessed or received data elements.

A kurtosis is the normalized fourth central moment of the values of a random variable, which describes how fast the density function approaches zero in the left and right tail. A negative kurtosis indicates that the variance is mostly caused by many values far away from the mean of the values. A positive kurtosis indicates that the variance is mainly affected by few extreme deviations from the mean of the values.

A computation subset is a subset of a Big Data set or a data stream which contains the data elements that may be involved in a kurtosis calculation. A computation subset is equivalent to a moving computation window when performing a kurtosis calculation on streamed data or time series data. Within the description of embodiments of the present invention, the difference between a computation window and a computation subset is that data elements in a computation window are ordered but that in a computation subset are not.

As used herein, a component of a kurtosis is a quantity or expression appearing in the kurtosis's definition equation or any transforms of the equation. A kurtosis is the single largest component of a kurtosis itself. A kurtosis may be calculated using one or more components of kurtosis. Some example components of a kurtosis may be found in FIG. 4B.

A component may be either directly incrementally calculated or indirectly incrementally calculated. The difference between them is that when directly incrementally calculating a component, the component is calculated based on the component's value in previous iteration but when indirectly incrementally calculating a component, the component is calculated based on components other than the component itself.

For a given component, it might be directly incrementally calculated in one algorithm but indirectly incrementally calculated in another algorithm.

For a given algorithm, assume the total number of different components is p (p≥1), the number of directly incrementally calculated components is v (1≤v≤p), then the number of indirectly incrementally calculated components is w=p−v (0≤w<p). For any algorithm, there will be at least one component being directly incrementally calculated. It is possible that all components are directly incrementally calculated (in this case v=p and w=0). However, directly incrementally calculated components must be calculated in every iteration no matter if a kurtosis is accessed or not in a specific iteration.

For a given algorithm, if a component is directly incrementally calculated, then the component must be calculated in every iteration (i.e., whenever a data element is added to the computation subset). However, if a component is indirectly incrementally calculated, then the component may be calculated as needed based on one or more components other than the component itself, i.e., when a kurtosis needs to be calculated and accessed. Thus, when a kurtosis is not accessed in a specific iteration, only a small number of components are incrementally calculated to save computation time. It should be understood that an indirectly incrementally calculated component may also be used in the calculation of a directly incrementally calculated component. In that case, the indirectly incrementally calculated component should also be calculated in every iteration.

Embodiments of the invention include incrementally calculating one or more components of a kurtosis in modified computation subset based on one or more components calculated for the previous computation subset.

The computing system incrementally calculates one or more components of a kurtosis starting from either an empty computation subset or a non-empty computation subset if one or more components have already been calculated or initialized.

The computing system initializes a computation subset size counter and one or more (v(1≤v≤p)) components of a kurtosis.

When the computing system incrementally calculating one or more components of a kurtosis starting from an empty computation subset, the computation subset size is initialized with a zero and one or more components are initialized with zero values.

When incremental kurtosis calculation starts from a non-empty computation subset, the computation subset size and one or more components are initialized. The initialization of the computation subset size comprises counting the number of data elements contained in the computation subset or accessing or receiving a specified computation subset size. The initialization of the one or more components comprises calculating the one or more components through their definitions based on the data elements in the computation subset or accessing or receiving pre-calculated one or more components from one or more computing-device-readable media.

The computing system accesses or receives a data element or information about (e.g., index or address of) a data element to be added to the computation subset.

The computing system stores the accessed or received data element into an optional data buffer as needed. Pure incremental kurtosis calculation only needs access to the data element just received but don't need access to data elements received earlier than the just received data element, so the computing system doesn't necessarily allocate a storage space to keep all the data elements of a computation subset but at least always keeps the computation subset size and one or more components of a kurtosis for the computation subset. Modifying a computation subset may be reflected by modifying the computation subset size and one or more components of a kurtosis for the computation subset. However, since iterative kurtosis calculation requires access to earlier received data elements, when combining incremental kurtosis calculation with iterative kurtosis calculation, the received data element may need to be stored into a data buffer for future usage. Thus, the computing system may optionally have a data buffer for storing the received data elements for the computation subset and may need to store the received data element into the optional data buffer.

The computing system modifies the computation subset by adding the accessed or received data element to the computation subset and modifies the computation subset size by increasing its value by 1.

The computing system directly incrementally calculates one or more v(1≤v≤p) components of a kurtosis for the modified computation subset. Directly incrementally calculating the v components of a kurtosis includes directly incrementally calculating each of the v components one by one. Directly incrementally calculating a component includes accessing the component calculated for the previous computation subset and adding a contribution of the added data element to the component mathematically.

The computing system indirectly incrementally calculating $w=p-v$ components as needed: indirectly incrementally calculating the w components includes indirectly incrementally calculating each of the w components one by one. Indirectly incrementally calculating a component includes calculating the component using one or more components other than the component itself (Depending on a specific algorithm used, calculating each of the w components may also need access to and use of the data element added to the computation subset). The one or more components may have been initialized, directly incrementally calculated or indirectly incrementally calculated.

The computing system generates a kurtosis as needed based on one or more incrementally calculated components.

The computing system may keep accessing or receiving a data element or information about (e.g., index or address of) a data element to be added to the computation subset, storing the accessed or received data element into an optional data buffer as needed, modifying the computation subset and the computation subset size, directly incrementally calculating v ($1 \leq v \leq p$) components, indirectly incrementally calculating $w=p-v$ components as needed and generating a kurtosis as needed, and the computing system may repeat this process for as many times as needed.

Embodiments of the present invention may comprise or utilize a special purpose or general-purpose computing device including computer hardware, such as, for example, one or more processors and system memory, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates incrementally calculating kurtosis for Big Data or streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, kurtosis calculation module 191 and component calculation modules 131. Kurtosis calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Data from different data sources may also be stored in storage system 1011 which may be accessed for Big Data analysis. It should be understood that FIG. 1 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
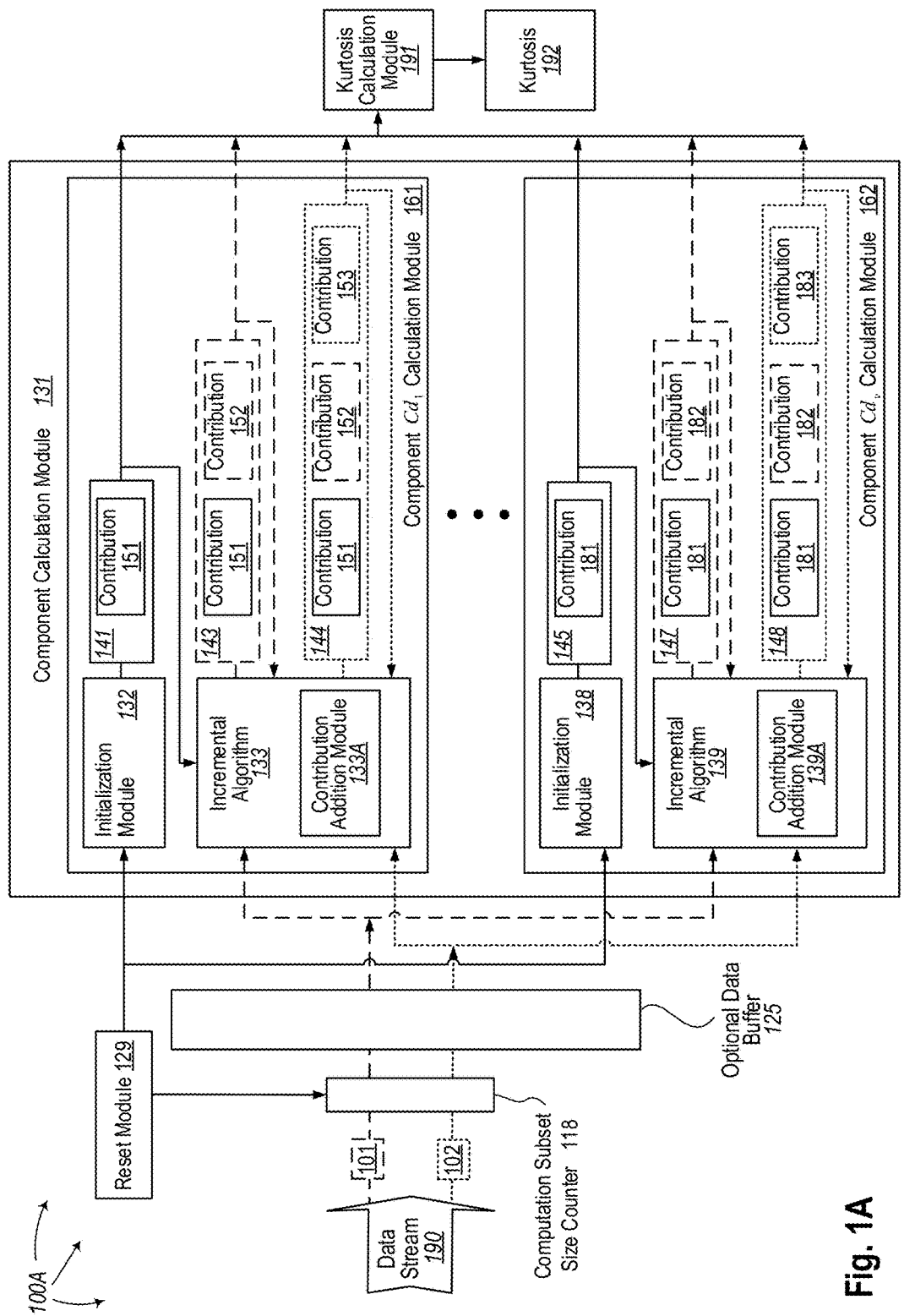
FIG. 1A illustrates an example computing system architecture that facilitates incrementally calculating kurtosis for streamed data with all components being directly incrementally calculated.

FIG. 1A illustrates an example computing system architecture 100A that facilitates incrementally calculating kurtosis for streamed data. FIG. 1A illustrates 1007 and 1006 shown in FIG. 1. Referring to FIG. 1A, computing system architecture 100A includes component calculation module 131. Component calculation module 131 may be connected to (or is part of) a network, such as, for example, a Local Area Network ("LAN"), a Wide Area Network ("WAN"), and even the Internet. Accordingly, component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of kurtosis calculation module 191, and kurtosis calculation module 191 will generate kurtosis 192.

In general, data stream 190 may be a sequence of digitally encoded signals (e.g., packets of data or data packets) used to transmit or receive information that is in the process of being transmitted. Data stream 190 may stream data elements to computing system architecture 100A. Data stream 190 may stream stored data and be a live stream.

Computation subset size counter 118 may be implemented in hardware or software. When it is implemented in hardware, counter 118 may be a small device that may update a computation subset size stored in a location in counter 118. When it is implemented in software, counter 118 may be just a variable stored in RAM, hard drive or any other computing-device-readable storage media, and the content of counter 118 is a computation subset size. Computation subset size counter 118 may be used to keep track the size of a computation subset. Whenever receiving a data element, the computing system adjusts the computation subset by adding the data element to the computation subset and adjusts the computation subset size counter 118 by increasing its content or value by 1. Computation subset size counter 118 may be accessed or received by component calculation module 131, and it may be reset to 0 when incremental kurtosis calculation is reset or set to a specific value by reset module 129 when incremental kurtosis calculation starts working on a non-empty computation subset. Within the description of this disclosure, a computation subset size counter is equivalent to a computation subset size and may be used interchangeably.

For example, as depicted in FIG. 1A, when data element 101 is received, the counter 118 will be increased by 1. Both the computation subset size counter 118 and data element 101 may be accessed or received by component calculation module 131.

Subsequently, data element 102 may be received. When this happens, the computation subset counter 118 will increase its value by 1. Both the modified computation subset size counter 118 and data element 102 may be accessed or received by component calculation module 131.

As streamed data elements are accessed or received, they may be stored into an optional data buffer 125 as needed (i.e., when combining incremental kurtosis calculation with iterative kurtosis calculation).

Referring to computing system architecture 100A, component calculation module 131 comprises v (v=p≥1) component calculation modules for calculating v components for data elements in a computation subset. The number of components v varies depending on which incremental algorithm is used. As depicted in FIG. 1A, component calculation module 131 comprises component $Cd_1$ calculation module 161 and component $Cd_v$ calculation module 162, and there are v−2 other component calculation modules between them. Calculation module 161 comprises initialization module 132 for initializing component $Cd_1$ and incremental algorithm 133 for incrementally calculating component $Cd_1$. Calculation module 162 comprises initialization module 138 for initializing component $Cd_v$ and incremental algorithm 139 for incrementally calculating component $Cd_v$. Initialization module 132 is configured to initialize component $Cd_1$ for data elements in a computation subset and initialization module 138 is configured to initialize component $Cd_v$ for data elements in a computation subset. Component $Cd_1$ 141 is the initial value of component $Cd_1$. Initialization module 132 may be used for an initialization of component $Cd_1$ or when kurtosis calculations are reset. Initialization module 132 either initialize component $Cd_1$ 141 to be zero if the computation subset is empty (the computation subset size counter is zero) or a specific value contribution 151 passed in by reset module 129 if the computation subset is non-empty. Similarly, initialization module 138 may be used for an initialization of component $Cd_v$ or when kurtosis calculations are reset. Component $Cd_v$ 145 is the initial value of component $Cd_v$. Initialization module 138 either initialize component $Cd_v$ 145 to be zero if the computation subset is empty (the computation subset size counter is zero) or a specific value contribution 181 passed in by reset module 129 if the computation subset is non-empty.

Incremental algorithms are also configured to calculate v components for data elements in a modified computation subset. Incremental algorithm 133 receives a prior component $Cd_1$ value and the added data element as input. Incremental algorithm 133 calculates a component $Cd_1$ for the modified computation subset from the prior component $Cd_1$ value and the added data element. Contribution addition module 133A may add a contribution for the added data element to the prior component $Cd_1$ mathematically. Adding a contribution of the added data element may be used to calculate component $Cd_1$ for the modified computation subset. Incremental algorithm 139 works in a similar way as incremental algorithm 133. Incremental algorithm 139 receives a prior component $Cd_v$ value and the added data element as input. Incremental algorithm 139 calculates a component $Cd_v$ for the modified computation subset from the prior component $Cd_v$ value and the added data element. Contribution addition module 139A may add a contribution for the added data element to the prior component $Cd_v$. Adding a contribution for the added data element may be used to calculate component $Cd_v$ for the modified computation subset.

Referring to FIG. 1A, computing system architecture 100A also includes kurtosis calculation module 191. Once p (p=v≥1) components of a kurtosis are calculated by component calculation module 131, kurtosis calculation module 191 may calculate the kurtosis 192 as needed using one or more incrementally calculated components.

Figure 1B:
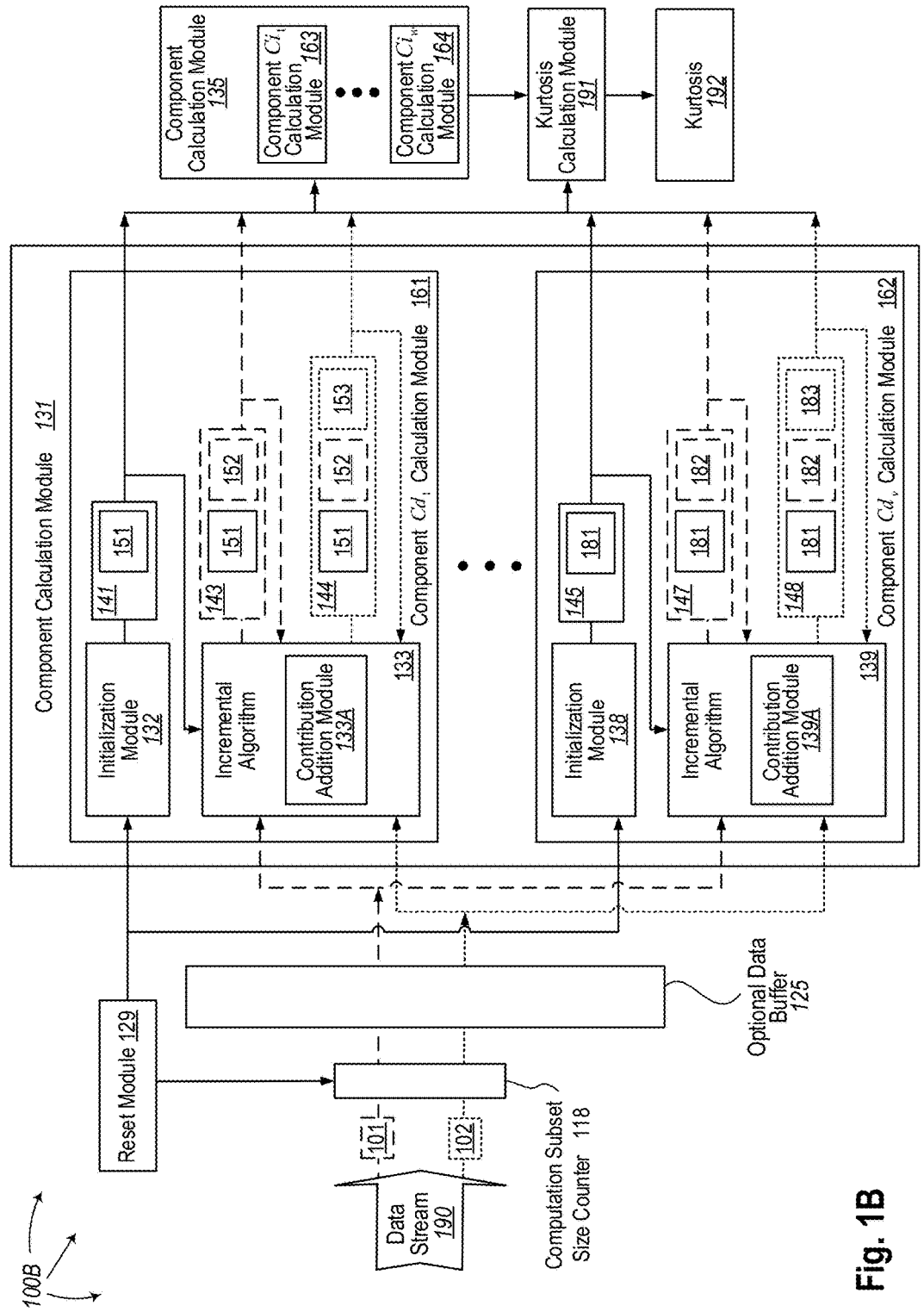
FIG. 1B illustrates an example computing system architecture that facilitates incrementally calculating kurtosis for streamed data with some components being directly incrementally calculated and some components being indirectly incrementally calculated.

FIG. 1B illustrates an example computing system architecture 100B that facilitates incrementally calculating kurtosis for Big Data or streamed data with some (v(1≤v<p)) components being directly incrementally calculated and some (w(w=p−v)) components being indirectly incrementally calculated. The number v as well as the number w is algorithm dependent. Many parts included in computing system architectures 100B and 100A have same reference numbers. Those parts have similar structures and work in similar ways. In certain implementations, the difference between computing system architectures 100B and 100A may be that architecture 100B includes a component calculation module 135. All parts except component calculation module 135 in 100B work in a similar way as those parts with same reference numbers in 100A. Instead of repeating what have already been explained in the description about 100A, only the different part is discussed here. The number v in 100B may not be the same number v as in 100A, because some directly incrementally calculated components in 100A are indirectly incrementally calculated in 100B. In 100A, v=p≥1, but in 100B, 1≤v<p. Referring to FIG. 1B, computing system architecture 100B includes component calculation module 135. The output of components calculation module 131 may be used as the input of component calculation module 135, and the output of calculation modules 131 and 135 may be used as the input of kurtosis calculation module 191, and kurtosis calculation module 191 may generate kurtosis 192. Component calculation module 135 generally includes w=p−v component calculation modules for indirectly incrementally calculating w components. For example, component calculation module 135 includes calculation module 163 for indirectly incrementally calculating component $Ci_1$ and calculation module 164 for indirectly incrementally calculating component $Ci_w$, and there are w−2 component calculation modules in between. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing system architecture 100B, once all p (p=v+w) components have been calculated, kurtosis calculation module 191 may be used for calculating a kurtosis 192 as needed based on one or more incrementally calculated components.

Figure 1C:
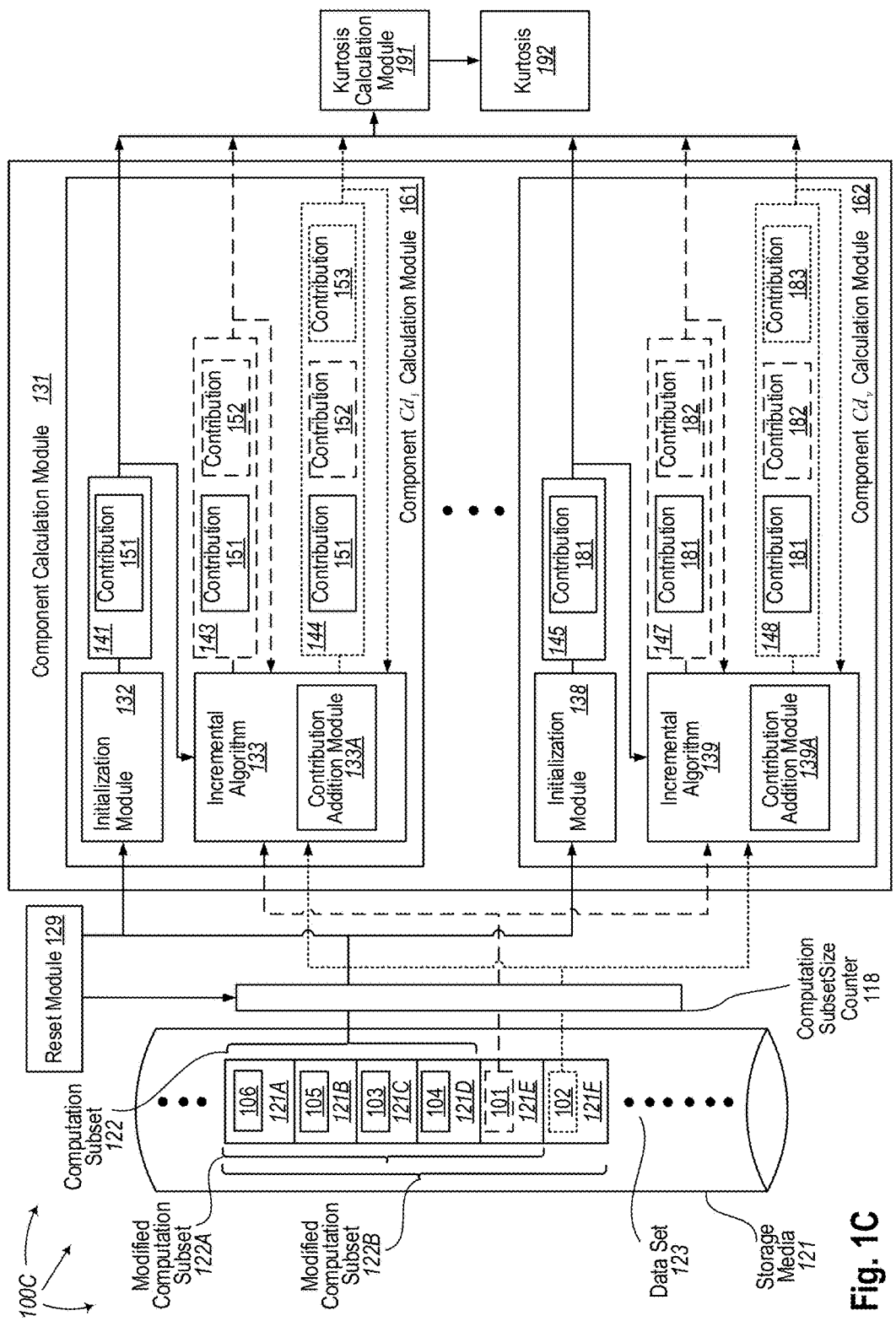
FIG. 1C illustrates an example computing system architecture that facilitates incrementally calculating kurtosis for Big Data with all components being directly incrementally calculated.

FIG. 1C illustrates an example computing system architecture 100C that facilitates incrementally calculating kurtosis for streamed data with all components (p(p=v≥1)) being directly incrementally calculated, in other words p=v≥1 and w=0. FIG. 1C illustrates 1007 and 1006 shown in FIG. 1. Referring to FIG. 1C, computing system architecture 100C includes component calculation module 131 and kurtosis calculation module 191. Component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet.

In general, storage media 121 may be a single local storage medium and may also be a complex storage system that comprises multiple physically distributed storage devices managed by a storage management system.

Storage media 121 comprises a data set 123. As depicted, data set 123 comprises multiple data elements stored in multiple locations of storage media 121. For example, data elements 106, 105, 103, 104, 101, and 102 are stored in locations 121A, 121B, 121C, 121D, 121E and 121F, etc., . . . . There are multiple data elements stored in other locations of storage media 121.

Assume that a kurtosis calculation is started from computation subset 122. Computation subset 122 with a specified size of 4 (i.e., n=4) contains a number of data elements of data set 123: data elements 106, 105, 103 and 104. All the data elements ranging from 103 to 106 in computation subset 122 may be accessed for initializing one or more components of the kurtosis.

Next, data elements 101 may be accessed from locations 121E. Data element 101 will be added to computation subset 122, then computation subset 122 becomes modified computation subset 122A. Modified computation subset 122A contains 5 data elements: 106, 105, 103, 104 and 101. The computing system may incrementally calculate a kurtosis for modified computation subset 122A.

Subsequently, data element 102 may be accessed from locations 121F. Data element 102 will be added to modified computation subset 122A, then modified computation subset 122A becomes modified computation subset 122B. Modified computation subset 122B contains 6 data elements: 106, 105, 103, 104, 101 and 102. The computing system may incrementally calculate a kurtosis for modified computation subset 122B.

Referring to computing system architecture 100C, component calculation module 131 comprises v=p≥1) component calculation modules for directly incrementally calculating v components for data elements in a computation subset. The number of components, v, varies depending on which incremental algorithm is used. As depicted in FIG. 1C, component calculation module 131 comprises component $Cd_1$ calculation module 161 and component $Cd_v$ calculation module 162, and there are v−2 other component calculation modules between them. Component $Cd_1$ calculation module 161 comprises initialization module 132 for initializing component $Cd_1$ and incremental algorithm 133 for incrementally calculating component $Cd_1$. Component $Cd_v$ calculation module 162 comprises initialization module 138 for initializing component $Cd_v$ and incremental algorithm 139 for incrementally calculating component $Cd_v$. Initialization module 132 is configured to initialize component $Cd_1$ for data elements in a computation subset and initialization module 138 is configured to initialize component $Cd_v$ for data elements in a computation subset. Component $Cd_1$ 141 is the initial value of component $Cd_1$. Initialization module 132 may be used for an initialization of component $Cd_1$ or when kurtosis calculations are reset. Initialization module 132 initializes component $Cd_1$ 141 to be zero if the computation subset is empty (the computation subset size counter is zero) or a specific value contribution 151 passed in by reset module 129 or a value calculated from the data elements in the computation subset if the computation subset is non-empty. Similarly, initialization module 138 may be used for an initialization of component $Cd_v$ or when kurtosis calculations are reset. Component $Cd_v$ 145 is the initial value of component $Cd_v$. Initialization module 138 initializes component $Cd_v$ 145 to be zero if the computation subset is empty (the computation subset size counter is zero) or a specific value contribution 181 passed in by reset module 129 or a value calculated from the data elements in the computation subset if the computation subset is non-empty.

Incremental algorithms are also configured to directly incrementally calculate v components for data elements in a computation subset. Incremental algorithm 133 receives a prior component $Cd_1$ value and an added data element as input. Incremental algorithm 133 directly incrementally calculates a component $Cd_1$ for the modified computation subset based on the prior component $Cd_1$ value and the added data element. Contribution addition module 133A may add a contribution for the added data element to the prior component $Cd_1$. Adding a contribution for the added data element may be used to calculate component $Cd_1$ for the modified computation subset. Incremental algorithm 139 works in a similar way as incremental algorithm 133. Incremental algorithm 139 receives a prior component $Cd_v$ value and an added data element as input. Incremental algorithm 139 directly incrementally calculates a component $Cd_v$ for the modified computation subset based on the prior component $Cd_v$ value and the added data element. Contribution addition module 139A may add a contribution for the added data element to the prior component $Cd_v$. Adding a contribution for the added data element may be used to calculate component $Cd_v$ for the modified computation subset.

Referring to FIG. 1C, computing system architecture 100C also includes kurtosis calculation module 191. Once p (p=v≥1) components of a kurtosis are calculated by component calculation module 131, kurtosis calculation module 191 may calculate the kurtosis 192 as needed using one or more incrementally calculated components.

Figure 1D:
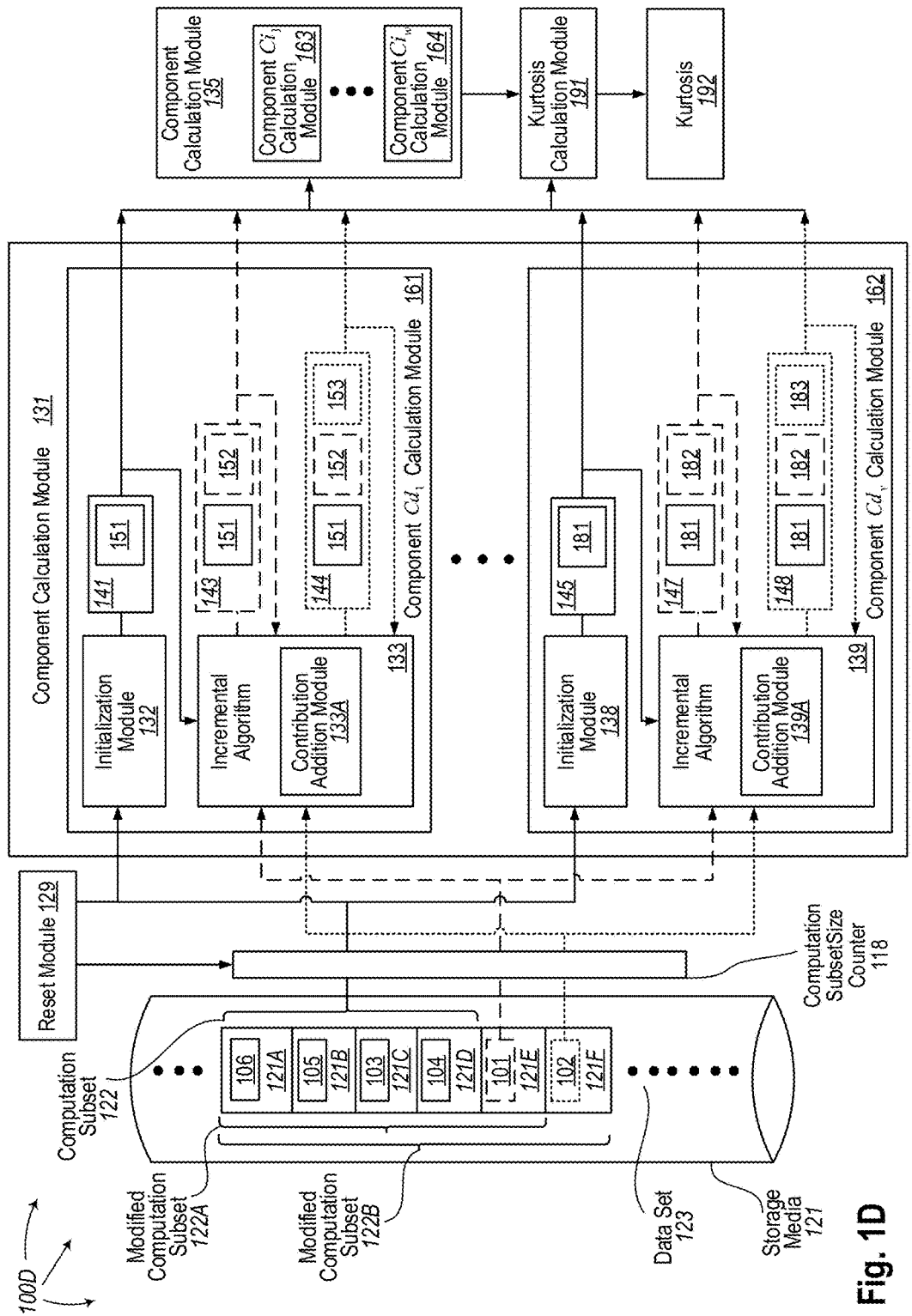
FIG. 1D illustrates an example computing system architecture that facilitates incrementally calculating kurtosis for Big Data with some components being directly incrementally calculated and some components being indirectly incrementally calculated.

FIG. 1D illustrates an example computing system architecture 100D that facilitates incrementally calculating kurtosis for Big Data with some (v(1≤v<p)) components being directly incrementally calculated and some (w(w=p−v)) components being indirectly incrementally calculated. Number v and number w are algorithm dependent. Many parts included in computing system architectures 100D and 100C have same reference numbers. Those parts have similar structures and work in similar ways. In certain implementations, the difference between computing system architectures 100D and 100C may be that architecture 100D includes a component calculation module 135. All parts except component calculation module 135 in 100D work in a similar way as those parts with the same reference numbers in 100C. Instead of repeating what have already been explained in the description about 100C, only the different part is discussed here. The number v in 100D may not be the same number v as in 100C, because some directly incrementally calculated components in 100C are indirectly incrementally calculated in 100D. In 100C, v=p≥1, but in 100D, 1≤v<p. Referring to FIG. 1D, computing system architecture 100D includes component calculation module 135. The output of components calculation module 131 may be used as the input of component calculation module 135, and the output of calculation modules 131 and 135 may be used as the input of kurtosis calculation module 191, and kurtosis calculation module 191 may generate kurtosis 192. Component calculation module 135 generally includes w=p−v component calculation modules for indirectly incrementally calculating w components. For example, component calculation module 135 includes calculation module 163 for indirectly incrementally calculating component $Ci_1$ and calculation module 164 for indirectly incrementally calculating component $Ci_w$, and there are w−2 component calculation modules between them. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing system architecture 100D, once all p (p=v+w) components have been calculated, kurtosis calculation module 191 may be used for calculating a kurtosis 192 as needed based on one or more incrementally calculated components.

Figure 2:
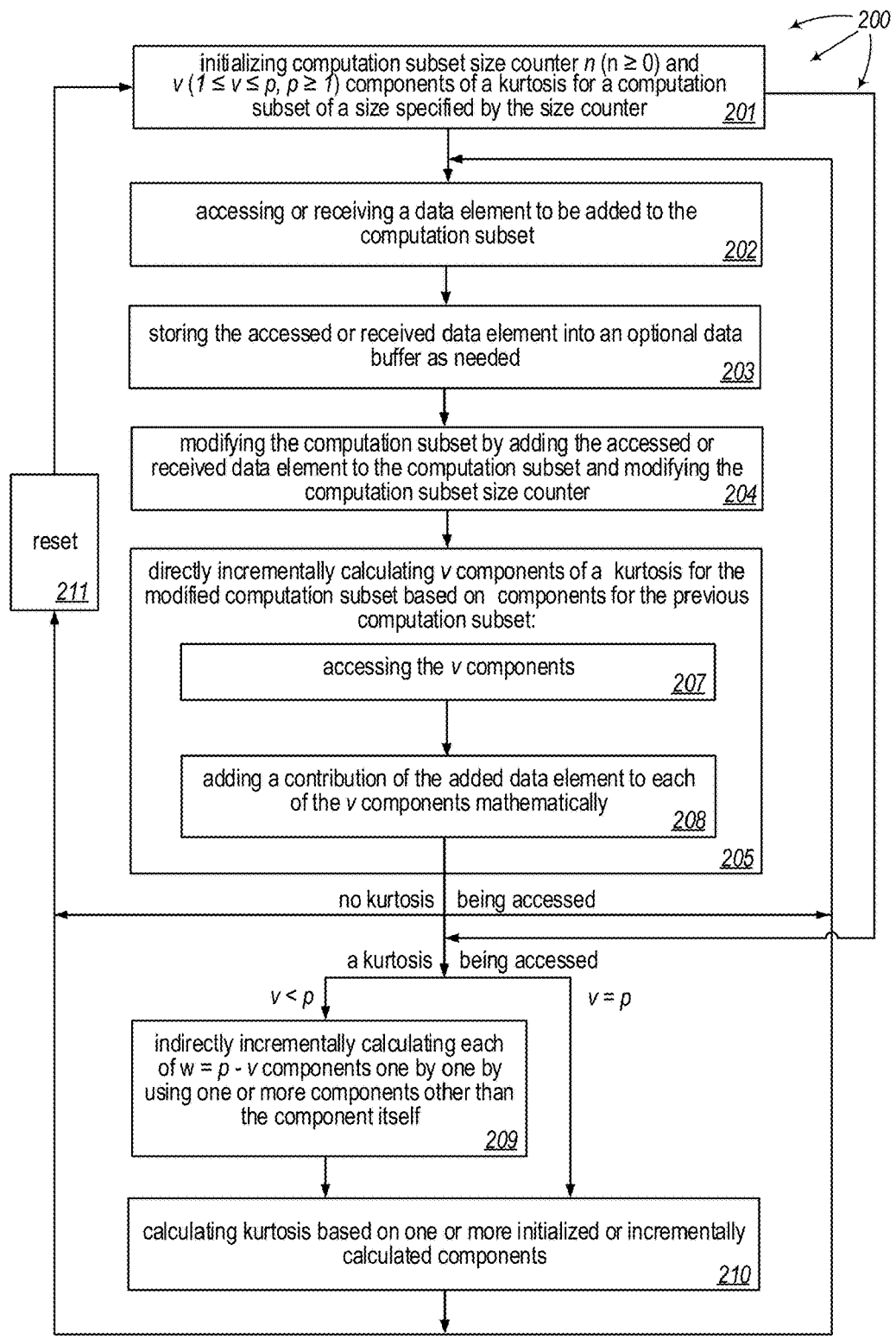
FIG. 2 illustrates a flow chart of an example method for incrementally calculating a kurtosis for Big Data or streamed data.

FIG. 2 illustrates a flow chart of an example method 200 for incrementally calculating kurtosis for Big Data or streamed data. Method 200 will be described with respect to the components and data of computing system architectures 100A, 100B, 100C and 100D.

Method 200 includes initializing computation subset size counter 118 and v(1≤v≤p, p≥1) components of a kurtosis for a computation subset (201). For example, initialization module 132 may initialize component $Cd_1$ 141 with contribution 151. Similarly, initialization module 138 may initialize component $Cd_v$ 145 with contribution 181. Contribution 151 and contribution 181 may be calculated from the data elements in the computation subset or from other kurtosis calculation results such as iterative or decremental kurtosis calculation passed in by reset module 129.

Method 200 includes accessing or receiving a data element to be added to the computation subset (202). For example, data element 101 may be accessed or received. Method 200 includes storing the accessed or received data element into an optional data buffer as needed (203). Incremental kurtosis calculation algorithms don't need to store the accessed or received data element; however when incremental kurtosis calculation combined with iterative kurtosis calculation, the accessed or received data element may need to be stored, so the accessed or received data element may be stored into an optional data buffer as needed. For example, data element 101 may be stored into an optional data buffer 125 as needed. Method 200 includes modifying the computation subset by adding the accessed or received data element to the computation subset and modifying the computation subset size counter by adding its value by 1 (204). For example, data element 101 may be added to the computation subset and computation subset size counter 118 may be modified by increasing its current value by 1 upon accessing or receiving the data element 101.

Method 200 includes directly incrementally calculating v ($1 \leq v \leq p$) components of a kurtosis for the modified computation subset based on the v components for previous computation subset (205). For example, incremental algorithm 133 may be used for directly incrementally calculating component $Cd_1$ 143, and incremental algorithm 139 may be used for directly incrementally calculating component $Cd_v$ 147.

Directly incrementally calculating the v components of a kurtosis for the modified computation subset includes accessing the v components of the kurtosis in the previous computation subset (207). For example, incremental algorithm 133 may access component $Cd_1$ 141. Similarly, incremental algorithm 139 may access component $Cd_v$ 145.

Directly incrementally calculating v components of a kurtosis includes adding a contribution of the added data element to each of the v components mathematically (208). For example, incrementally calculating component $Cd_1$ 143 may include contribution addition module 133A adding contribution 152 to component $Cd_1$ 141 mathematically, and incrementally calculating component $Cd_v$ 147 may include contribution addition module 139A adding contribution 182 to component $Cd_v$ 145 mathematically. Contribution 152 and 182 are contributions of data element 101.

As depicted in FIG. 1A, component $Cd_1$ 143 includes contribution 151 (a contribution from initialization) and contributions 152 (contributions from data elements 101). Similarly, component $Cd_v$ 147 includes contribution 181 (a contribution from initialization) and contribution 182 (a contribution from data element 101).

Besides directly incrementally calculated components, some components may be indirectly incrementally calculated. Method 200 includes indirectly incrementally calculating each of $w=p-v$ components one by one as needed based on one or more components other than the component itself (209) when $v<p$, i.e., not all components are directly incrementally calculated. Since the w indirectly incrementally calculated components are calculated using other components, they might not need to be initialized. In addition, the w indirectly incrementally calculated components might not need to be calculated in every iteration (i.e., when a data is added to the computation subset). They only need to be calculated when a kurtosis is accessed to save computation time. For example, referring to FIG. 1B where some components are directly incrementally calculated and some are indirectly incrementally calculated, calculation module 163 may indirectly incrementally calculate $Ci_1$ based on one or more components other than $Ci_1$, and the one or more components may have been initialized, directly incrementally calculated or indirectly incrementally calculated. Similarly, calculation module 164 may indirectly incrementally calculate $Ci_w$ based on one or more components other than $Ci_w$, and the one or more components may have been initialized, directly incrementally calculated or indirectly incrementally calculated. For a given component, it may be directly incrementally calculated in one algorithm but indirectly incrementally calculated in another algorithm. For example, referring to FIG. 4C, in Example Incremental Kurtosis Calculation Algorithm 1, component $QX_{k+1}$ for the $k+1^{th}$ iteration is directly incrementally calculated based on component $QX_k$ for the $k^{th}$ iteration and other components and the data element added to the computation subset. However, referring to FIG. 4E, in Example Incremental Kurtosis Calculation Algorithm 3, component $QX_{k+1}$ for the $k+1^{th}$ iteration is indirectly incrementally calculated based on components other than QX. For a given algorithm, directly incrementally calculated components must be calculated whenever a data element is added to the computation subset, no matter if a kurtosis is accessed or not; however, an indirectly incrementally component only needs to be calculated as needed, i.e., when a kurtosis is accessed. For example, referring to FIG. 4E, in Example Incremental Algorithm 3, component $QX_{k+1}$ only needs to be calculated only kurtosis $\gamma_{k+1}^{(2)}$ is accessed.

Method 200 includes calculating a kurtosis based on one or more incrementally calculated components of the kurtosis (210).

202-208 may be repeated as additional data elements are accessed or received. 209-210 may be repeated as needed. For example, subsequent to calculating components ranging from $Cd_1$ 143 to $Cd_v$ 147, data element 102 may be accessed or received.

Incremental algorithm 133 may be used for directly incrementally calculating component $Cd_1$ 144 based on component $Cd_1$ 143. Incremental algorithm 133 may access component $Cd_1$ 143. Directly incrementally calculating component $Cd_1$ 144 may include contribution addition module 133A adding contribution 153 to component $Cd_1$ 143 mathematically. Contribution 153 is a contribution from data element 102.

Similarly, incremental algorithm 139 may be used to calculate component $Cd_v$ 148 based on component $Cd_v$ 147. Incremental algorithm 139 may access component $Cd_v$ 147. Incrementally calculating component $Cd_v$ 148 may include contribution addition module 139A adding contribution 183 to component $Cd_v$ 147 mathematically. Contribution 183 is a contribution from data element 102.

As depicted, component $Cd_1$ 144 includes contribution 151 (a contribution from initialization), contribution 152 (a contribution from data element 101), and contribution 153 (a contribution from data element 102), and component $Cd_v$ 148 includes contribution 181 (a contribution from initialization), contribution 182 (a contribution from data element 101), and contribution 183 (a contribution from data element 102).

When a data element is accessed or received, component $Cd_1$ 144 may be used for directly incrementally calculating a component $Cd_1$ for the modified computation subset and component $Cd_v$ 148 may be used for directly incrementally calculating a component $Cd_v$ for the modified computation subset.

As depicted, reset 211 may be used for resetting incremental kurtosis calculation. When reset 211 is invoked either after 205 or 210, the computation subset size counter and v ($1 \leq v \leq p$) components of a kurtosis will be initialized. For example, component $Cd_1$ 141 may be initialized as zero when the computation subset size counter is reset to zero or a specific value if the value has already been calculated when the computation subset size counter is non-zero. The latter case may happen when combining incremental kurtosis calculation with iterative kurtosis calculation or decremental kurtosis calculation. Component $Cd_v$ 145 may be initialized in the same way.

Figure 3A:
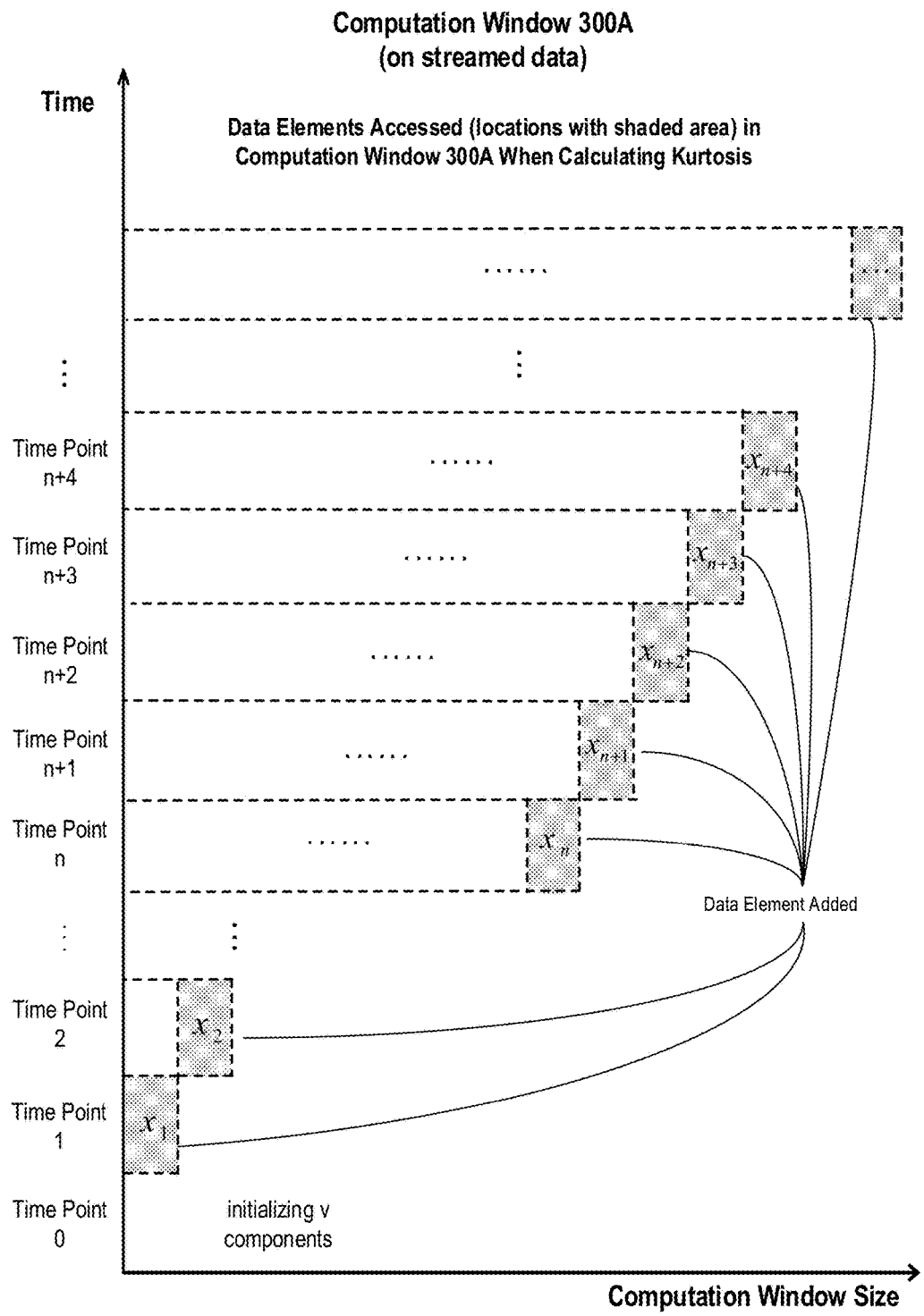
FIG. 3A illustrates data element that is accessed from a computation window for incrementally calculating a kurtosis on streamed data.

FIG. 3A illustrates data that is accessed from a computation window 300A for incrementally calculating a kurtosis on streamed data. The difference between a computation window and a computation subset is that the data elements in a computation window are ordered (e.g., data element is always added to either the right end or the left end of a computation window). For example, referring to FIG. 3A, a newly accessed or received data element is always added to the right end of computation window 300A. Computation window 300A may be either empty from very beginning or non-empty where v ($1 \leq v \leq p$) components have already been calculated. As time progresses, data elements, for example, data element $x_1$, then $x_2$, then $x_3$, . . . , then $x_n$, $x_{n+1}$, . . . is added to the computation window and accessed respectively for directly incrementally calculating v components of a kurtosis for the modified computation window, indirectly incrementally calculating w=p−v components, and calculating the kurtosis based on one or more incrementally calculated components. The v components may be directly incrementally calculated using the added data element and the v components for the previous computation window. For a given incremental algorithm, v is a constant, so the number of operations for directly incrementally calculating v components is a constant, and the number of operations for indirectly incrementally calculating w=p−v components is also a constant. Thus, the computation workload for calculating p components for a given computation window is reduced and a kurtosis may be calculated using one or more incrementally calculated components. As n increases the reduction in computation workload becomes more substantial.

Figure 3B:
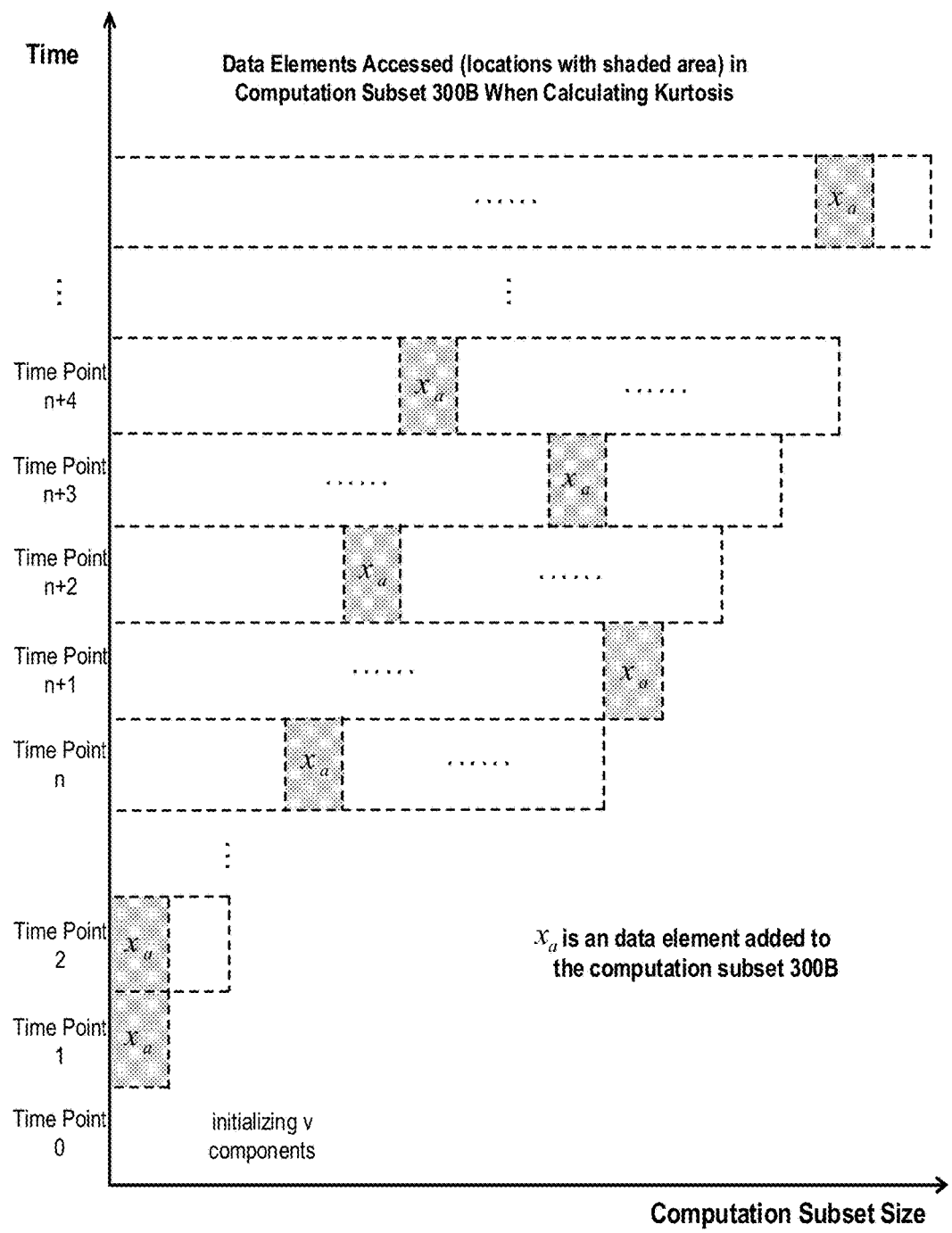
FIG. 3B illustrates data element that is accessed from a computation subset for incrementally calculating a kurtosis on Big Data.

FIG. 3B illustrates data that is accessed from a computation subset 300B for incrementally calculating a kurtosis on Big Data. The difference between a computation subset and a computation window is that the data elements in a computation subset are not ordered (e.g., a data element may be added to any position of a computation subset). For example, referring to FIG. 3B, a newly accessed or received data element may be added to any position of computation subset 300B. Computation subset 300B may be either empty from very beginning or non-empty where v ($1 \leq v \leq p$) components have already been calculated. As time progresses, a data element, for example, data element $x_a$, is added to the computation subset at the position indicated by shaded area and accessed respectively for directly incrementally calculating v components of a kurtosis for the modified computation subset, indirectly incrementally calculating w=p−v components, and calculating the kurtosis using one or more incrementally calculated components. The v components may be directly incrementally calculated using the added data element and the v components for the previous computation subset. For a given incremental algorithm, v is a constant, so the number of operations for directly incrementally calculating v components is a constant, and the number of operations for indirectly incrementally calculating w=p−v components is also a constant. Thus, the computation workload for calculating p components for a given computation subset is reduced and a kurtosis may be calculated based on one or more incrementally calculated components. As n increases the reduction in computation workload becomes more substantial.

FIG. 4A illustrates the definition of kurtosis. Suppose a computation subset $X=\{x_i|i=1, \ldots, n\}$ is a subset of a Big Data set or streamed data which contains the data elements to be involved in kurtosis calculation. Equation 401 is a traditional equation for calculating a sum $S_k$ of all the data elements in computation subset X in the $k^{th}$ iteration. Equation 402 is a traditional equation for calculating a mean $\bar{x}_k$ of all the data elements in computation subset X in the $k^{th}$ iteration. Equation 403 is a traditional equation for calculating a kurtosis $\gamma_k^{(2)}$ of all the data elements in a computation subset of size n. Assuming the computation subset X of size n is changed with a data element $x_a$ being added. Define the modified computation subset as X. The modified computation subset size becomes n+1. The iteration becomes $k+1^{th}$ iteration. Equation 404 is a traditional equation for calculating a sum $S_{k+1}$ of all the data elements in the modified computation subset X' in the $k+1^{th}$ iteration. Equation 405 is a traditional equation for calculating a mean $\bar{x}_{k+1}$ of all the data elements in the modified computation subset X' in the $k+1^{th}$ iteration. Equation 406 is a traditional equation for calculating a kurtosis $\gamma_{k+1}^{(2)}$ of all the data elements in the modified computation subset X' in the $k+1^{th}$ iteration.

FIG. 4B illustrates some components of a kurtosis and basic incremental component calculation equations. A component is a quantity or expression appearing in the kurtosis's equations or transform of the equation. The following are a few examples of components of the kurtosis.

$$S_k = \sum_1^n x_i$$

$$\bar{x}_k = \frac{s_k}{n} = \frac{1}{n}\sum_1^n x_i$$

$$SS_k = \sum_1^n x_i^2$$
$$SX_k = \sum_1^n (x_i - \bar{x}_k)^2$$
$$CS_k = \sum_1^n x_i^3$$
$$CX_k = \sum_1^n (x_i - \bar{x}_k)^3$$
$$QS_k = \sum_1^n x_i^4$$
$$QX_k = \sum_1^n (x_i - \bar{x}_k)^4$$
$$1/n \sum_1^n (x_i - \bar{x}_k)^2$$
$$1/n \sum_1^n (x_i - \bar{x}_k)^3$$
$$1/n \sum_1^n (x_i - \bar{x}_k)^4$$
$$(1/n \sum_1^n (x_i - \bar{x}_k)^2)^2$$

$$\gamma_k^{(2)} = \frac{n \sum_1^n (x_i - \bar{x}_k)^4}{\left(\sum_1^n (x_i - \bar{x}_k)^2\right)^2}$$

A kurtosis may be calculated based on one or more components or combinations of them, so there are multiple algorithms supporting incremental kurtosis calculation. To illustrate how to use components to incrementally calculate kurtosis, three different example incremental kurtosis calculation algorithms are given in FIG. 4C, FIG. 4D and FIG. 4E respectively and corresponding examples using those algorithms with data are given in FIG. 5B, FIG. 5C and FIG. 5D respectively. A new iteration of calculation is started each time any component of a kurtosis is recalculated due to a data change in the computation subset which causes a computation subset to change to a modified computation subset. A sum or a mean is the basic component to be used for calculating a kurtosis. Equation 407 is an equation for directly incrementally calculating a sum $S_{k+1}$ of all the data elements in the modified computation subset X'. Equation 408 is an equation for directly incrementally calculating a mean $\bar{x}_{k+1}$ of all the data elements in the modified computation subset X'. Either a sum $S_{k+1}$ or a mean $\bar{x}_{k+1}$ will be used in all three incremental kurtosis calculation algorithms described later.

FIG. 4C illustrates the first example incremental kurtosis calculation algorithm (incremental algorithm 1). Incremental algorithm 1 comprises incremental calculation of components $S_{k+1}$ or $\bar{x}_{k+1}$, $SS_{k+1}$, $SX_{k+1}$, $CS_{k+1}$ and $QX_{k+1}$, and a kurtosis $\gamma_{k+1}^{(2)}$ may be calculated based on $SX_{k+1}$ and $QX_{k+1}$ once they are calculated. Equation 407 may be used for directly incrementally calculating component $S_{k+1}$ if component $S_k$ is available. Equation 408 may be used for directly incrementally calculating component $\bar{x}_{k+1}$ if component $\bar{x}_k$ is available. Equation 409 is a traditional equation for calculating component $SS_k$ in the computation subset X. Equation 410 is a traditional equation for calculating component $SS_{k+1}$ in the modified computation subset X'. Equation 411 may be used for directly incrementally calculating component $SS_{k+1}$ in the modified computation subset X if component $SS_k$ is available. Equation 412 is a traditional equation for calculating component $SX_k$ in the computation subset X. Equation 413 is a traditional equation for calculating $SX_{k+1}$ in the modified computation subset X'. Equations 414 may be used for indirectly incrementally calculating component $SX_{k+1}$ in the modified computation subset X if components $S_{k+1}$ or $\bar{x}_{+1}$ and $SS_{k+1}$ are available. Equations 414 comprise multiple equations but only one of them is needed depending on if a sum $S_{k+1}$ or a mean $\bar{x}_{k+1}$ or both are available. Equation 415 is a traditional equation for calculating component $CS_k$ in the computation subset X. Equation 416 is a traditional equation for calculating component $CS_{k+1}$ in the modified computation subset X'. Equation 417 may be used for directly incrementally calculating component $CS_{k+1}$ in the modified computation subset X if component $CS_k$ is available. Equation 418 is a traditional equation for calculating component $QX_k$ in the computation subset X. Equation 419 is a traditional equation for calculating component $QX_{k+1}$ in the modified computation subset X'. Equations 420 may be used for indirectly incrementally calculating component $QX_{k+1}$ in the modified computation subset X if components $QX_k$, $CS_k$, $SS_k$, $S_k$ or $\bar{x}_k$ and $S_{k+1}$ or $\bar{x}_{+1}$ are available. Equations 420 comprise multiple equations but only one of them is needed depending on if a sum or a mean or both are available. Equation 421 may be used for calculating the kurtosis $\gamma_{k+1}^{(2)}$ for the modified computation subset X' once components $QX_{k+1}$ and $SX_{k+1}$ are calculated.

FIG. 4D illustrates the second example incremental kurtosis calculation algorithm (incremental algorithm 2). Incremental algorithm 2 comprises incremental calculation of components $S_{k+1}$ or $\bar{x}_{k+1}$, $SS_{k+1}$, $SX_{k+1}$, $CS_{k+1}$, $QS_{k+1}$ and $QX_{k+1}$, and a kurtosis $\gamma_{k+1}^{(2)}$ may be calculated based on components $SX_{k+1}$ and $QX_{k+1}$ once they are calculated. Equation 407 may be used for directly incrementally calculating component $S_{k+1}$ if component $S_k$ is available. Equation 408 may be used for directly incrementally calculating component $\bar{x}_{k+1}$ if component 0.4 is available. Equation 422 is a traditional equation for calculating $SS_k$ in the computation subset X. Equation 423 is a traditional equation for calculating component $SS_{k+1}$ in the modified computation subset X'. Equation 424 may be used for directly incrementally calculating component $SS_{k+1}$ in the modified computation subset X if component $SS_k$ is available. Equation 425 is a traditional equation for calculating component $SX_k$ in the computation subset X. Equation 426 is a traditional equation for calculating component $SX_{k+1}$ in the modified computation subset X'. Equations 427 may be used for indirectly incrementally calculating component $SX_{k+1}$ in the modified computation subset X if components $S_k$ or $\bar{x}_k$ and $S_{k+1}$ or $\bar{x}_{+1}$ and $SX_k$ are available. Equations 427 comprise multiple equations but only one of them is needed depending on if a sum or a mean or both are available. Equation 428 is a traditional equation for calculating component $CS_k$ in the computation subset X. Equation 429 is a traditional equation for calculating component $CS_{k+1}$ in the modified computation subset X'. Equation 430 may be used for directly incrementally calculating component $CS_{k+1}$ in the modified computation subset if component $CS_k$ is available. Equation 431 is a traditional equation for calculating component $QS_k$ in the computation subset X. Equation 432 is a traditional equation for calculating component $QS_{k+1}$ in the modified computation subset X'. Equation 433 may be used for directly incrementally calculating component $QS_{k+1}$ in the modified computation subset X' if component $QS_k$ is available. Equation 434 is a traditional equation for calculating component $QX_k$ in the computation subset X. Equation 435 is a traditional equation for calculating component $QX_{k+1}$ in the modified computation subset X'. Equations 436 may be used for indirectly incrementally calculating component $QX_{k+1}$ in the modified computation subset X' if components $QS_{k+1}$, $SS_{k+1}$, $CS_{k+1}$, and $S_{k+1}$ or $\bar{x}_{k+1}$ are available. Equations 436 comprise multiple equations but only one of them is needed depending on if a sum or a mean or both are available. Equation 437 may be used for calculating the kurtosis $\gamma_{k+1}^{(2)}$ for the modified computation subset X once components $QX_{k+1}$ and $SX_{k+1}$ are calculated.

FIG. 4E illustrates the third example incremental kurtosis calculation algorithm (incremental algorithm 3). Incremental algorithm 3 comprises incremental calculation of components $S_{k+1}$ or $\bar{x}_{k+1}$, $SS_{k+1}$, $SX_{k+1}$, $CS_{k+1}$, $QS_{k+1}$ and $QX_{k+1}$, and a kurtosis $\gamma_k^{(2)}$ may be directly calculated based on components $QX_{k+1}$ and $SX_{k+1}$ once they are calculated. Equation 407 may be used for directly incrementally calculating component $S_{k+1}$ if component $S_k$ is available. Equation 408 may be used for directly incrementally calculating component $\bar{x}_{k+1}$ if component $\bar{x}_k$ is available. Equation 438 is a traditional equation for calculating component $SS_k$ in the computation subset X. Equation 439 is a traditional equation for calculating component $SS_{k+1}$ in the modified computation subset X'. Equation 440 may be used for directly incrementally calculating component $SS_{k+1}$ in the modified computation subset X if component $SS_k$ is available. Equation 441 is a traditional equation for calculating component $SX_k$ in the computation subset X. Equation 442 is a traditional equation for calculating component $SX_{k+1}$ in the modified computation subset X'. Equations 443 may be used for indirectly incrementally calculating component $SX_{k+1}$ in the modified computation subset X if components $SS_{k+1}$ and $S_{k+1}$ or $\bar{x}_{+1}$ are available. Equations 443 comprise multiple equations but only one of them is needed depending on if a sum $S_{k+1}$ or a mean $\bar{x}_{k+1}$ or both are available. Equation 444 is a traditional equation for calculating component $CS_k$ in the computation subset X. Equation 445 is a traditional equation for calculating component $CS_{k+1}$ in the modified computation subset X'. Equations 446 may be used for directly incrementally calculating component $CS_{k+1}$ in the modified computation subset X'. Equation 447 is a traditional equation for calculating component $QS_k$ in the computation subset X. Equation 448 is a traditional equation for calculating component $QS_{k+1}$ in the modified computation subset X'. Equations 449 may be used for directly incrementally calculating component $QS_{k+1}$ in the modified computation subset X'. Equation 450 is a traditional equation for calculating component $QX_k$ in the computation subset X. Equation 451 is a traditional equation for calculating component $QX_{k+1}$ in the modified computation subset X'. Equations 452 may be used for indirectly incrementally calculating component $QX_{k+1}$ in the modified computation subset X' if components $QS_{k+1}$, $CS_{k+1}$, $SS_{k+1}$ and $S_{k+1}$ or $\bar{x}_{k+1}$ are available. Equations 452 comprise multiple equations but only one of them is needed depending on if a sum $S_{k+1}$ or a mean $\bar{x}_{k+1}$ or both are available. Equation 453 may be used for calculating the kurtosis $\gamma_k^{(2)}$ for the computation subset X once components $QX_k$ and $SX_k$ are calculated. Equation 454 may be used for calculating the kurtosis $\gamma_{k+1}^{(2)}$ for the modified computation subset X' once components $QX_{k+1}$ and $SX_{k+1}$ are calculated.

To demonstrate incremental kurtosis calculation algorithms and their comparison against traditional algorithms, three examples are given below. Three computation subsets of data elements are used. For traditional algorithms, the calculations for all three computation subsets are exactly the same. For incremental algorithms, initialization of one or more components is performed for the first computation subset, and incremental calculations are performed for the second and third computation subsets.

FIG. 5A illustrates an example of calculating a kurtosis on Big Data Set 501 using traditional algorithms. Big Data Set 501 is either a Big Data set or streamed data. Computation subset 502 includes 4 data elements in Big Data Set 501. Computation subset size 503 (n) is 4. There are a total of 2 divisions, 14 multiplications, 9 additions, and 8 subtractions when calculating kurtosis $\gamma_1^{(2)}$ on 4 data elements without any optimization.

The same equations may be used to calculate the kurtosis for computation subset 504 as shown in FIG. 5A Cont'd 1, however the computation subset size 505 is increased to 5. The calculation includes a total of 2 divisions, 17 multiplications, 12 additions, and 10 subtractions when calculating kurtosis $\gamma_2^{(2)}$ on 5 data elements without any optimization.

The same equations may be used to calculate the kurtosis for computation subset 506 as shown in FIG. 5A Cont'd 2. The computation subset size 507 is increased to 6. The calculation includes a total of 2 divisions, 20 multiplications, 15 additions, and 12 subtractions when calculating kurtosis $\gamma_3^{(2)}$ on 6 data elements without any optimization. Traditional algorithms for calculating kurtosis on n data elements will typically take 2 divisions, 3n+2 multiplications, 3(n−1) additions, and 2n subtractions without any optimization.

FIG. 5B illustrates an example of calculating a kurtosis using incremental algorithm 1. The calculations for computation subset 502 uses traditional equations to calculate the initial values of components $\bar{x}_1$, $SS_1$, $SX_1$, $CS_1$ and $QX_1$. For example, equation 402 may be used for calculating the component $\bar{x}_1$. Equation 409 is a traditional equation for calculating $SS_1$ in the computation subset X. Equation 412 is a traditional equation for calculating $SX_1$ in the computation subset X. Equation 415 is a traditional equation for calculating $CS_1$ in the computation subset X. Equation 418 is a traditional equation for calculating $QX_1$ in the computation subset X. Equation 421 may be used for calculating kurtosis $\gamma_1^{(2)}$ in the computation subset X. There are a total of 2 divisions, 26 multiplications, 15 additions and 8 subtractions when calculating kurtosis $\gamma_1^{(2)}$ without any optimizations. In practice, using traditional algorithms to calculate those components will not happen, because incremental kurtosis calculation would either start from computation subset is empty or where those components have already been calculated when the computation subset is not empty. Using traditional algorithms to calculate those components on this non-empty computation subset here is only for the purpose of illustrating the incremental kurtosis calculation algorithm. The kurtosis of computation subset 502 is then calculated based on those components.

However, for subset 504, the components of the kurtosis for computation subset 504 may be incrementally calculated from the components of the kurtosis for computation subset 502. The computation subset size 505 is increased to 5. For example, equation 408 may be used for incrementally calculating the component $\bar{x}_2$ based on component $\bar{x}_1$ previously calculated for computation subset 502 and adding a contribution of the added data element $x_a$ mathematically. Equation 411 may be used for incrementally calculating the component $SS_2$ based on component $SS_1$ previously calculated for computation subset 502 and adding a contribution of the added data element $x_a$ mathematically. Equation 414 may be used for incrementally calculating the component $SX_2$ based on components $SS_2$ and $\bar{x}_2$. Equation 417 may be used for incrementally calculating the component $CS_2$ based on $CS_1$ and adding a contribution of the added data element $x_a$ mathematically. Equation 420 may be used for incrementally calculating the component $QX_2$ based on components $QX_1$, $\bar{x}_1$ and $\bar{x}_2$. Equation 421 may be used for calculating kurtosis $\gamma_2^{(2)}$ based on components $QX_2$ and $SX_2$. There are a total of 2 divisions, 17 multiplications, 10 additions and 6 subtractions when calculating kurtosis $\gamma_2^{(2)}$.

The same equations may also be used for incrementally calculating the components of kurtosis for computation subset 506 from the components of kurtosis for computation subset 504. The computation subset size 507 is increased to 6. Although the computation subset size is increased, the number of operations performed by the incremental kurtosis calculation algorithm remains constant. Equation 408 may be used for incrementally calculating component $x_3$ based on component $x_2$ previously calculated for computation subset 504 and adding a contribution of the added data element $x_a$ mathematically. Equation 411 may be used for incrementally calculating component $SS_3$ based on component $SS_2$ previously calculated for computation subset 504 and adding a contribution of the added data element $x_a$ mathematically. Equation 414 may be used for incrementally calculating the component $SX_3$ based on components $SS_3$ and $x_3$. Equation 417 may be used for incrementally calculating the component $CS_3$ based on $CS_2$ and adding a contribution of the added data element $x_a$ mathematically. Equation 420 may be used for incrementally calculating the component $QX_3$ based on components $QX_2$, $CS_2$, $SS_2$, $x_2$ and $x_3$. Equation 421 may be used for calculating kurtosis $\gamma_3^{(2)}$ based on components $QX_3$ and $SX_3$. There are still a total of 2 divisions, 17 multiplications, 10 additions and 6 subtractions when incrementally calculating kurtosis $\gamma_3^{(2)}$. As such, starting from computation subset 504, the number of operations used when incrementally calculating the kurtosis is (potentially substantially) less than when using traditional equations.

FIG. 5C illustrates an example of calculating a kurtosis using incremental algorithm 2. A mean instead of a sum is used in this example. The calculations for computation subset 502 uses traditional equations to calculate the initial values of components $\bar{x}_1$, $SS_1$, $SX_1$, $CS_i$, $QS_1$ and $QX_1$ and then use components $SX_1$ and $QX_1$ to calculate kurtosis $\gamma_1^{(2)}$. For example, equation 402 may be used for calculating component $\bar{x}_1$. Equation 422 may be used for calculating component $SS_1$. Equation 425 may be used for calculating component $SX_1$. Equation 428 may be used for calculating component $CS_1$. Equation 431 may be used for calculating component $QS_1$. Equation 434 may be used for calculating component $QX_1$. The kurtosis $\gamma_1^{(2)}$ of computation subset 502 is then calculated based on components $QX_1$ and $SX_1$ through equation 437. There are a total of 2 divisions, 22 multiplications, 18 additions and 4 subtractions when calculating the kurtosis with some optimizations. In practice, for incremental kurtosis calculation, using traditional algorithms to do an initial components calculation will not happen, because incremental kurtosis calculation would either start from computation subset is empty or where those components have already been calculated when the computation subset is not empty. Using traditional algorithms to calculate those components on this non-empty computation subset here is only for the purpose of illustrating the incremental kurtosis calculation algorithm.

However, for subset 504, the components of the kurtosis for computation subset 504 may be incrementally calculated from the components of the kurtosis for computation subset 502. For example, equation 408 may be used for incrementally calculating the component $\bar{x}_2$ based on component $\bar{x}_1$ previously calculated for computation subset 502 and adding a contribution of the added data element $x_a$ mathematically. Equation 424 may be used for incrementally calculating the component $SS_2$ based on component $SS_1$ previously calculated for computation subset 502 and adding a contribution of the added data element $x_a$ mathematically. Equation 427 may be used for incrementally calculating the component $SX_2$ based on components $\bar{x}_1$, $\bar{x}_2$ $SX_1$ and adding a contribution of the added data element $x_a$ mathematically. Equation 430 may be used for incrementally calculating component $CS_2$ based on component $CS_1$ previously calculated for computation subset 502 and adding a contribution of the added data element $x_a$ mathematically. Equation 433 may be used for incrementally calculating the component $QS_2$ based on component $QS_1$ previously calculated for computation subset 502 and adding a contribution of the added data element $x_a$ mathematically. Equation 436 may be used for incrementally calculating the component $QX_2$ based on components $QS_2$, $SS_2$, $CS_2$ and $\bar{x}_2$ previously calculated for computation subset 502. Equation 437 may then be used for calculating kurtosis $\gamma_2^{(2)}$ based on components $QX_2$ and $SX_2$. There are a total of 2 divisions, 14 multiplications, 7 additions and 4 subtractions when calculating kurtosis $\gamma_2^{(2)}$.

The same equations may also be used for incrementally calculating the components of kurtosis for computation subset 506 from the components of kurtosis for computation subset 504. The computation subset size 507 is increased to 6. Although the computation subset size is increased, the number of operations performed by the incremental kurtosis calculation algorithm remains constant. There are still a total of 2 divisions, 14 multiplications, 7 additions and 4 subtractions when incrementally calculating kurtosis $\gamma_3^{(2)}$. As such, starting from computation subset 504, the number of operations used when incrementally calculating the kurtosis is (potentially substantially) less than when using traditional equations.

FIG. 5D illustrates an example of calculating a kurtosis using incremental algorithm 3. The calculations for computation subset 502 uses traditional equations to calculate the initial values of components $\bar{x}_1$, $SS_1$, $SX_1$, $CS_1$, $QS_1$ and $QX_1$. For example, equation 402 may be used for calculating component $\bar{x}_1$. Equation 438 may be used for calculating component $SS_1$. Equation 441 may be used for calculating component $SX_1$. Equation 444 may be used for calculating component $CS_1$. Equation 447 may be used for calculating component $QS_1$. Equation 450 may be used for calculating component $QX_1$. Equation 453 may then be used for calculating the kurtosis $\gamma_1^{(2)}$ of computation subset 502 based on components $QX_1$ and $SX_1$. There are a total of 2 divisions, 22 multiplications, 18 additions and 4 subtractions when calculating the kurtosis. In practice, for incremental kurtosis calculation, using traditional algorithms to do an initial components calculation will not happen, because incremental kurtosis calculation would either start from computation subset is empty or where those components have already been calculated when the computation subset is not empty. Using traditional algorithms to calculate those components on this non-empty computation subset here is only for the purpose of illustrating the incremental kurtosis calculation algorithm.

However, for subset 504, the components of the kurtosis for computation subset 504 may be incrementally calculated from the components of the kurtosis for computation subset 502. For example, equation 408 may be used for incrementally calculating the component $\bar{x}_2$ based on $\bar{x}_1$ previously calculated for computation subset 502 and adding a contribution of the added data element $x_a$ mathematically. Equation 440 may be used for incrementally calculating the component $SS_2$ based on $SS_1$ previously calculated for computation subset 502 and adding a contribution of the added data element $x_a$ mathematically. Equation 443 may be used for incrementally calculating the component $SX_2$ based on components $SS_2$ and $\bar{x}_2$. Equation 446 may be used for incrementally calculating the component $CS_2$ based on components $CS_1$ and adding a contribution of the added data element $x_a$ mathematically. Equation 449 may be used for incrementally calculating the component $QS_2$ based on components $QS_1$ and adding a contribution of the added data element $x_a$ mathematically. Equation 452 may be used for incrementally calculating the component $QX_2$ based on components $QS_2$, $CS_2$, $SS_2$ and $\bar{x}_2$. Equation 454 may then be used for calculating the kurtosis $\gamma_2^{(2)}$ based on components $QX_2$ and $SX_2$. There are a total of 2 divisions, 14 multiplications, 6 additions and 3 subtractions when calculating kurtosis $\gamma_2^{(2)}$.

The same equations may also be used for incrementally calculating the components of kurtosis for computation subset 506 from the components of kurtosis for computation subset 504. The computation subset size 507 is increased to 6. Although the computation subset size is increased, the number of operations performed by the incremental kurtosis calculation algorithm remains constant. There are a total of 2 divisions, 14 multiplications, 6 additions and 3 subtractions when incrementally calculating kurtosis $\gamma_3^{(2)}$. As such, starting from computation subset 504, the number of operations used when incrementally calculating the kurtosis is (potentially substantially) less than when using traditional equations.

In the three examples above, a mean is used for the incremental kurtosis calculation. If a sum instead of a mean is used, kurtosis may also be incrementally calculated though the numbers of operations are different.

FIG. 6 illustrates computational loads for traditional kurtosis algorithm and incremental kurtosis algorithms for n=6 for computation subset 506. As depicted, there are fewer multiplication operations, fewer addition operations, and fewer subtraction operations using any one of the incremental algorithms.

FIG. 7 illustrates computational loads for traditional kurtosis algorithm and incremental kurtosis algorithm for n=1,000,000 for any computation subset other than the first computation subset. Again, as depicted, there are fewer multiplication operations, fewer addition operations, and fewer subtraction operations using any one of the incremental algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for calculating a kurtosis for a modified computation subset on a computing-device-based computing system which comprises one or more computing devices and one or more storage media, each of the one or more computing devices comprising one or more processors, the method comprising:
    initializing, by the computing-device-based computing system, a computation subset size counter, at least one of a sum and a mean, and one or more other components of a kurtosis for a pre-modified computation subset of a data stream or a data set on at least one of the one or more storage media, wherein the pre-modified computation subset contains a specified number, n (n≥6), of data elements from the data stream or the data set;
    accessing or receiving, by the computing-device-based computing system, a data element to be added to the pre-modified computation subset;
    modifying, by the computing-device-based computing system, the pre-modified computation subset by:
        adding the accessed or received data element to the pre-modified computation subset; and
        modifying the computation subset size counter by increasing its value by 1;
    incrementally deriving, by the computing-device-based computing system, at least one of a sum and a mean for the modified computation sub set;
    directly incrementally deriving, by the computing-device-based computing system, one or more components of a kurtosis other than a sum and a mean for the modified computation subset based at least in part on the one or more components of the kurtosis other than a sum and a mean initialized or derived for the pre-modified computation subset, wherein the directly incrementally deriving includes:
        accessing the one or more components of the kurtosis other than a sum and a mean for the pre-modified computation subset without accessing all data elements in the modified computation subset thereby saving computing resources and reducing the computing-device-based computing system's power consumption; and
        adding any contribution of the data element added to the pre-modified computation subset to each of the accessed components mathematically wherein not all data elements in the modified computation subset are used in the computation to reduce number of operations performed by the computing-device-based computing system thereby increasing calculation efficiency; and
    generating, by the computing-device-based computing system, a kurtosis for the modified computation subset based on one or more of the incrementally derived components.

2. The computing-system-implemented method of claim 1, wherein the generating a kurtosis for the modified computation subset further comprises indirectly incrementally deriving, by the computing-device-based computing system, one or more components of the kurtosis for the modified computation subset, wherein the indirectly incrementally deriving the one or more components includes individually calculating each respective one of the one or more components based on one or more components other than the respective one component.

3. The computing-system-implemented method of claim 1, wherein accessing or receiving a data element includes accessing or receiving a plurality of z (z>1) data elements to be added to the pre-modified computation subset, and wherein the method further comprises incrementally performing, for each of the respective z data elements, the modifying the pre-modified computation subset, the incrementally deriving at least one of a sum and a mean for the modified computation subset, the directly incrementally deriving the one or more components of a kurtosis other than a sum and a mean for the modified computation subset, and the generating a kurtosis for the modified computation subset.

4. The computing-system-implemented method of claim 1, wherein accessing or receiving a data element includes accessing or receiving a plurality of z data elements to be added to the pre-modified computation subset, and wherein the method further comprises incrementally performing, for each of the respective z data elements, the modifying the pre-modified computation subset, the incrementally deriving at least one of a sum and a mean for the modified computation subset, and the directly incrementally deriving the one or more components of a kurtosis other than a sum and a mean for the modified computation subset.

5. The computing-system-implemented method of claim 1, wherein the accessing or receiving a data element to be added to the pre-modified computation subset further comprises storing the accessed or received data element into a data buffer on at least one of the one or more storage media.

6. A computing system, the computing system comprising:
    one or more computing devices;
    each computing device comprising one or more processors;
    one or more storage media; and
    one or more calculation modules that, when executed by at least one of the one or more computing devices, determine a kurtosis for a modified computation subset, the one or more calculation modules configured to:
    a. initialize a computation subset size counter, at least one of a sum and a mean, and one or more other components of a kurtosis for a pre-modified computation subset of a data stream or a data set on at least one of the one or more storage media, wherein the pre-modified computation subset contains a specified number, n (n≥6), of data elements from the data stream or the data set;
    b. access or receive a data element to be added to the pre-modified computation sub set;
    c. modify the pre-modified computation subset by adding the to-be-added data element to the pre-modified computation subset and modifying the computation subset size counter by increasing its value by 1;
    d. incrementally calculate at least one of a sum and a mean for the modified computation subset;
    e. directly incrementally calculate one or more components of a kurtosis other than a sum and a mean for the modified computation subset based at least in part on the one or more components of the kurtosis other than a sum and a mean initialized or calculated for the pre-modified computation subset, wherein incremental calculation of the one or more components includes to add any contribution of the added data element to each of the one or more components of the kurtosis initialized or calculated for the pre-modified computation subset mathematically without accessing and using all data elements in the modified computation subset thereby reducing data access latency, reducing number of operations performed by the computing system, and reducing the computing system's power consumption; and f. generate a kurtosis for the modified computation subset based on one or more of the incrementally calculated components.

7. The computing system of claim 6, wherein the generating a kurtosis for the modified computation subset further comprises indirectly incrementally calculating one or more components of a kurtosis for the modified computation subset, wherein indirectly incrementally calculating one or more components includes individually calculating each respective one of the one or more components based on one or more components other than the respective one component.

8. The computing system of claim 6, wherein the one or more calculation modules, when executed by at least one of the one or more computing devices, perform c, d, e, and f each time b is performed.

9. The computing system of claim 8, wherein the performing f comprises generating a kurtosis for the modified computation subset only when the kurtosis is accessed.

10. The computing system of claim 9, wherein the generating a kurtosis for the modified computation subset further comprises indirectly incrementally calculate one or more components of the kurtosis for the modified computation subset, wherein indirectly incrementally calculating one or more components includes individually calculating each respective one of the one or more components based on one or more components other than the respective one component.

11. The computing system of claim 6, wherein the one or more calculation modules, when executed by at least one of the one or more computing devices, perform c, d, and e each time b is performed.

12. The computing-system-implemented method of claim 3, wherein the generating a kurtosis for the modified computation subset comprises generating a kurtosis for the modified computation subset only when the kurtosis is accessed.

13. The computing-system-implemented method of claim 12, wherein the generating a kurtosis for the modified computation subset further comprises indirectly incrementally deriving, by the computing-device-based computing system, one or more components of the kurtosis for the modified computation subset, wherein the indirectly incrementally deriving the one or more components includes individually calculating each respective one of the one or more components based on one or more components other than the respective one component.

14. The computing system of claim 6, wherein the accessing or receiving a data element to be added to the pre-modified computation subset further comprises storing the accessed or received data element into a data buffer on at least one of the one or more storage media.

15. A computing system program product for use at a configured computing system which comprises one or more computing devices and one or more storage media, each computing device comprising one or more processors, the computing system program product comprising one or more non-transitory computing-device-readable storage media having stored thereon computing-device-executable instructions that, when executed by at least one of the one or more computing devices in the configured computing system, cause the configured computing system to perform a method for generating a kurtosis for data elements in a modified computation subset, the method including steps to:

initialize, by the configured computing system, a computation subset size counter, at least one of a sum and a mean, and one or more other components of a kurtosis for a pre-modified computation subset of a data stream or a data set on at least one of the one or more storage media, wherein the pre-modified computation subset contains a specified number, n (n≥6), of data elements from the data stream or the data set;

access or receive, by the configured computing system, a data element to be added to the pre-modified computation subset;

modify, by the configured computing system, the pre-modified computation subset via adding the accessed or received data element to the pre-modified computation subset and modifying the computation subset size counter;

incrementally calculate, by the configured computing system, at least one of a sum and a mean for the modified computation subset;

directly incrementally calculate, by the configured computing system, one or more components of a kurtosis other than a sum and a mean for the modified computation subset based at least in part on the one or more components of the kurtosis other than a sum and a mean initialized or calculated for the pre-modified computation subset, including to:

access the one or more components of the kurtosis other than a sum and a mean for the pre-modified computation subset without accessing all data elements in the modified computation subset thereby saving computing resources and reducing the configured computing system's power consumption; and add any contribution of the data element added to the pre-modified computation subset to each of the accessed components mathematically wherein not all data elements in the modified computation subset are used in the computation to reduce number of operations performed by the configured computing system thereby increasing calculation efficiency; and generate, by the configured computing system, a kurtosis for the modified computation subset based on one or more of the incrementally calculated components.

16. The computing system program product of claim 15, wherein the generating a kurtosis further comprises indirectly incrementally calculating, by the configured computing system, one or more components of the kurtosis for the modified computation subset, wherein indirectly incrementally calculating the one or more components includes individually calculating each respective one of the one or more components based on one or more components other than the respective one component.

17. The computing system program product of claim 15, wherein the computing-device-executable instructions that, when executed, further cause the configured computing system to access or receive a data element to be added to the pre-modified computation subset, to modify the pre-modified computation subset, to incrementally calculate at least one of a sum and a mean, to directly incrementally calculate the one or more components other than a sum and a mean, and to generate a kurtosis for the modified computation subset for each of multiple data elements to be accessed or received.

18. The computing system program product of claim 17, wherein the computing-device-executable instructions that, when executed, cause the configured computing system to generate a kurtosis comprise computing-device-executable instructions that, when executed, cause the configured computing system to generate a kurtosis for the modified computation subset only when the kurtosis is accessed.

19. The computing system program product of claim 18, wherein the generating a kurtosis for the modified computation subset further comprises indirectly incrementally calculate one or more components of the kurtosis for the modified computation subset, wherein indirectly incrementally calculating one or more components includes individually calculating each respective one of the one or more components based on one or more components other than the respective one component.

20. The computing system program product of claim 15, wherein the computing-device-executable instructions that, when executed, further cause the configured computing system to access or receive a data element to be added to the pre-modified computation subset, to modify the pre-modified computation subset, to incrementally calculate at least one of a sum and a mean, and to directly incrementally calculate the one or more components other than a sum and a mean for each of multiple data elements to be accessed or received.

* * * * *